US011896194B2

(12) United States Patent
Yang et al.

(10) Patent No.: US 11,896,194 B2
(45) Date of Patent: Feb. 13, 2024

(54) VACUUM CLEANER

(71) Applicant: LG Electronics Inc., Seoul (KR)

(72) Inventors: Ingyu Yang, Seoul (KR); Moohyun Ko, Seoul (KR); Jungwan Ryu, Seoul (KR); Daeho Chang, Seoul (KR)

(73) Assignee: LG Electronics Inc., Seoul (KR)

( * ) Notice: Subject to any disclaimer, the term of this patent is extended or adjusted under 35 U.S.C. 154(b) by 328 days.

(21) Appl. No.: 17/011,242

(22) Filed: Sep. 3, 2020

(65) Prior Publication Data

US 2020/0397203 A1 Dec. 24, 2020

Related U.S. Application Data

(62) Division of application No. 15/956,390, filed on Apr. 18, 2018, now Pat. No. 10,925,454.

(30) Foreign Application Priority Data

Apr. 20, 2017 (KR) ........................ 10-2017-0051240
Jul. 28, 2017 (KR) ........................ 10-2017-0096481

(51) Int. Cl.
*H05F 1/00* (2006.01)
*A47L 9/04* (2006.01)
(Continued)

(52) U.S. Cl.
CPC ............... *A47L 9/2889* (2013.01); *A47L 5/26* (2013.01); *A47L 9/0081* (2013.01);
(Continued)

(58) Field of Classification Search
CPC . A46B 1/00; A47L 5/26; A47L 9/0081; A47L 9/0411; A47L 9/0427;
(Continued)

(56) References Cited

U.S. PATENT DOCUMENTS 2,287,923 A 6/1942 White
3,011,188 A * 12/1961 Menche .............. A47L 11/4097 15/159.1

(Continued)

FOREIGN PATENT DOCUMENTS

CN 107233046 A * 10/2017 ............... A47L 9/00
CN 107320016 A * 11/2017 ............... A47L 9/02

(Continued)

OTHER PUBLICATIONS

Australian Office Action in Australian Application No. 2018256172, dated Mar. 15, 2019, 8 pages.

(Continued)

*Primary Examiner* — Marc Carlson

(74) *Attorney, Agent, or Firm* — Fish & Richardson P.C.

(57) ABSTRACT

A vacuum cleaner of the present disclosure includes a cleaner body having a suction motor provided inside thereof and a handle provided outside thereof, and a suction nozzle connected to the cleaner body, wherein the suction nozzle includes a housing having at least part of a front portion opened, and a rotary cleaning unit disposed inside the housing, having at least part thereof exposed through the opening of the housing, and configured to clean a floor by a rotating operation, wherein the rotary cleaning unit includes a cylindrical nozzle body rotatably installed inside the housing, and fiber filaments and metal filaments disposed on an outer circumferential surface of the nozzle body.

20 Claims, 21 Drawing Sheets

(51) Int. Cl.

| | |
|---|---|
| ***A47L 9/24*** | (2006.01) |
| ***A47L 5/26*** | (2006.01) |
| ***A47L 9/00*** | (2006.01) |
| ***A47L 9/28*** | (2006.01) |

(52) U.S. Cl.
CPC ........... *A47L 9/0411* (2013.01); *A47L 9/0427* (2013.01); *A47L 9/0455* (2013.01); *A47L 9/0477* (2013.01); *A47L 9/242* (2013.01); *H05F 1/00* (2013.01)

(58) Field of Classification Search
CPC ...... A47L 9/0455; A47L 9/0477; A47L 9/242; A47L 9/2889; H05F 1/00
See application file for complete search history.

(56) References Cited

U.S. PATENT DOCUMENTS

| | | | | |
|---|---|---|---|---|
| 4,268,769 | A | 5/1981 | Dorner et al. | |
| 4,715,085 | A * | 12/1987 | Johanson | A47L 9/2889 361/220 |
| 4,912,593 | A * | 3/1990 | Iwao | A47L 9/2857 361/220 |
| 4,914,777 | A * | 4/1990 | Cartellone | A47L 5/10 403/135 |
| 6,301,743 | B1 * | 10/2001 | Cloud, III | A47L 9/2889 15/412 |
| 6,324,714 | B1 * | 12/2001 | Walz | A46B 13/001 15/52.1 |
| 7,987,546 | B2 * | 8/2011 | Poch | A47L 11/282 15/49.1 |
| 8,186,009 | B2 | 5/2012 | Smith et al. | |
| 8,407,846 | B2 * | 4/2013 | Chen | H04L 1/20 15/230 |
| 8,572,804 | B2 | 11/2013 | Tran et al. | |
| 9,066,640 | B2 * | 6/2015 | Iles | A47L 9/0411 |
| 10,092,150 | B2 | 10/2018 | Isley et al. | |
| 10,213,077 | B2 * | 2/2019 | Genn | A47L 9/0455 |
| 10,667,661 | B2 | 6/2020 | Iles et al. | |
| 2003/0145424 | A1 * | 8/2003 | Stephens | A47L 5/30 15/383 |
| 2004/0031117 | A1 * | 2/2004 | Gaser | A46B 13/003 15/230 |
| 2004/0045125 | A1 * | 3/2004 | Park | A47L 9/0477 15/391 |
| 2005/0172447 | A1 | 8/2005 | Roney et al. | |
| 2008/0223407 | A1 * | 9/2008 | Smith | A47L 9/0427 134/21 |
| 2010/0037418 | A1 * | 2/2010 | Hussey | G05D 1/0234 901/1 |
| 2010/0306956 | A1 * | 12/2010 | Follows | A47L 9/0477 15/363 |
| 2010/0306957 | A1 * | 12/2010 | Follows | A46B 13/006 15/363 |
| 2010/0306958 | A1 * | 12/2010 | Follows | A47L 9/0466 15/383 |
| 2010/0306959 | A1 * | 12/2010 | Follows | A46B 13/005 15/88.4 |
| 2011/0214248 | A1 * | 9/2011 | McLeod | A47L 9/0416 15/383 |
| 2012/0011680 | A1 * | 1/2012 | Owen | A47L 9/04 15/383 |
| 2012/0144621 | A1 * | 6/2012 | Forbes | A47L 9/02 15/389 |
| 2013/0086769 | A1 * | 4/2013 | Iles | A47L 9/0411 15/363 |
| 2013/0152336 | A1 * | 6/2013 | Courtney | A47L 9/0433 15/383 |
| 2013/0276263 | A1 * | 10/2013 | Feng | A47L 9/0427 15/347 |
| 2016/0037986 | A1 * | 2/2016 | Iles | A47L 9/0477 15/246.2 |
| 2016/0183749 | A1 * | 6/2016 | Isley | A47L 9/0477 15/21.1 |
| 2016/0256025 | A1 | 9/2016 | Van Der Kooi et al. | |
| 2017/0127896 | A1 * | 5/2017 | Carter | A47L 9/0494 |
| 2017/0215667 | A1 * | 8/2017 | Thorne | A47L 9/0477 |
| 2017/0290483 | A1 * | 10/2017 | Dobson | A47L 9/0488 |
| 2018/0255991 | A1 * | 9/2018 | Der Marderosian | A47L 11/4041 |
| 2018/0303304 | A1 * | 10/2018 | Yang | A47L 9/0411 |
| 2018/0338656 | A1 * | 11/2018 | Carter | A47L 9/0488 |
| 2019/0125154 | A1 * | 5/2019 | Fay | A47L 9/2826 |

FOREIGN PATENT DOCUMENTS

| | | | | |
|---|---|---|---|---|
| DE | 19706239 | | 4/1998 | |
| DE | 102009043167 | | 5/2011 | |
| EP | 2422675 | A2 * | 2/2012 | A47L 9/246 |
| EP | 2992801 | | 3/2016 | |
| GB | 2447755 | | 2/2009 | |
| GB | 2481905 | | 1/2012 | |
| GB | 2481905 | A * | 1/2012 | A47L 9/045 |
| GB | 2499542 | A * | 8/2013 | A46D 1/02 |
| GB | 2524285 | A * | 9/2015 | A47L 9/0411 |
| JP | 0293802 | A2 * | 12/1988 | |
| JP | 3080148 | B | 6/1998 | |
| JP | 2000245662 | | 9/2000 | |
| JP | 2000354563 | A | 12/2000 | |
| JP | 2002136457 | A | 5/2002 | |
| JP | 2002136457 | A * | 5/2002 | |
| JP | 2004105770 | A | 4/2004 | |
| JP | 2006204525 | A | 8/2006 | |
| JP | 2008043574 | | 2/2008 | |
| JP | 2008194329 | A | 8/2008 | |
| JP | 2009261807 | | 11/2009 | |
| JP | 201-031550 | A | 2/2013 | |
| JP | 2013516261 | | 5/2013 | |
| JP | 2013516261 | A | 5/2013 | |
| JP | 2015177977 | A | 10/2015 | |
| JP | 2015177977 | A * | 10/2015 | A47L 9/0411 |
| KR | 1020120027357 | | 3/2012 | |
| KR | 20140014992 | | 2/2014 | |
| WO | WO-2017157291 | A1 * | 9/2017 | A47L 5/26 |

OTHER PUBLICATIONS

International Search Report in International Application No. PCT/KR2018/004582, dated Aug. 8, 2018, 15 pages.
Japanese Office Action in Japanese Appln. No. 2019-515524, dated Mar. 31, 2020, 19 pages (with English translation).
Office Action in Australian Appln. No. 2020201882, dated Jan. 11, 2022, 6 pages.
Office Action in Korean Appln. No. 10-2021-0030211, dated Oct. 27, 2021, 40 pages (with English translation).
German Office Action in German Application No. 112018000186, dated Dec. 16, 2022, 17 pages (with machine translation).

* cited by examiner

VACUUM CLEANER

CROSS-REFERENCE TO RELATED APPLICATION

This application is a divisional of U.S. application Ser. No. 15/956,390, filed on Apr. 18, 2018, which claims the benefit pursuant to 35 U.S.C. § 119(a) of earlier filing date and right of priority to Korean Application No. 10-2017-0051240 filed on Apr. 20, 2017, and Korean Application No. 10-2017-0096481 filed on Jul. 28, 2017, the contents of which are incorporated by reference herein in their entirety.

BACKGROUND

1. Field

The present disclosure relates to a structure capable of preventing static electricity generated in a vacuum cleaner from being transmitted to a user.

2. Description of the Related Art

A vacuum cleaner refers to a device that sucks dust and air using a suction force generated in a suction motor mounted inside a cleaner body and separates dust from the air for collection.

Such vacuum cleaners are divided into a canister cleaner, an upright cleaner, a stick cleaner, a handy cleaner, and a robot cleaner. For the canister cleaner, a suction nozzle for sucking dust is provided separately from a cleaner body, and connected to the cleaner body by a connecting device. For the upright cleaner, a suction nozzle is rotatably coupled to a cleaner body. The stick cleaner and the handy cleaner are used in a state where a user grips a cleaner body with a hand. However, a suction motor of the stick cleaner is disposed close to a suction nozzle (a lower center) and a suction motor of the handy cleaner is disposed close to a grip portion (an upper center). The robot cleaner travels by itself owing to an autonomous travel system so as to perform cleaning by itself.

A suction nozzle refers to a portion that is in contact with a floor to directly suck dust and air. A suction force generated in the suction motor mounted inside the cleaner body is transferred to the suction nozzle, and dust and air are sucked into the suction nozzle by the suction force.

The suction nozzle is provided with a rotary cleaning unit (or an agitator). The rotary cleaning unit scrapes (or sweeps) dust from a floor or carpet in a rotating manner so as to improve a cleaning performance. A brush is attached to the rotary cleaning unit to cause friction against the floor or the carpet.

When the brush causes the friction against the floor, static electricity is naturally generated due to the friction. Especially, when the brush causes the friction against the carpet, a generation frequency of the static electricity further increases.

However, the problem is that the generated static electricity is transmitted to the user along the cleaner body or an electric wire. Especially, in the case of the stick cleaner or the handy cleaner, since the user grips the cleaner body, the static electricity is likely to be directly transmitted to the user.

Among prior art documents, Korean Patent Publication No. 10-2012-0027357 (Mar. 21, 2012) and the like disclose configurations for preventing the generation or transfer of the static electricity. However, since the above-mentioned patent simply defines the property of filaments only as sheet resistance, there is a limit to be substantially applied to a vacuum cleaner.

SUMMARY

One aspect of the present disclosure is to provide a vacuum cleaner having a structure capable of preventing static electricity generated by rotation of a rotary cleaning unit from being transferred to a user.

Another aspect of the present disclosure is to provide a vacuum cleaner having a configuration capable of preventing deterioration in cleaning performance or overload of a suction motor owing to an antistatic structure.

Another aspect of the present disclosure is to provide a vacuum cleaner having a configuration capable of enhancing reliability of an antistatic structure.

A vacuum cleaner according to the present disclosure may include a rotary cleaning unit configured to clean a floor by a rotating operation. The rotary cleaning unit may include a rotatable nozzle body, and fiber filaments and metal filaments arranged on an outer circumferential surface of the nozzle body.

The vacuum cleaner may include a cleaner body having a suction motor provided inside thereof and a handle provided outside thereof, and a suction nozzle connected to the cleaner body.

The suction nozzle may include a housing having at least part of a front surface thereof opened. The rotary cleaning unit may be provided inside the housing, and at least part thereof may be exposed through the front opening of the housing.

The nozzle body may be rotatably installed inside the housing and have a cylindrical shape.

The metal filament may include a fiber filament, and a conductive coating layer coated on an outer circumferential surface of the fiber filament.

The conductive coating layer may be formed of brass or digenite ($Cu_9S_5$).

The conductive coating layer may have an average thickness of 0.3 to 1.0 μm.

The metal filament may have an average thickness of 220 to 260 dTex (deci-Tex).

A number ratio of the metal filaments to the sum of the fiber filaments and the metal filaments may be 2.5% or more.

An area ratio of the metal filaments on the outer circumferential surface of the nozzle body may be 2.5% or more.

Electric resistance of the single metal filament may be 100 kΩ or less.

Tensile strength of the single metal filament may be 3.5 cN/dTex (centi Newton/deci-Tex) or more.

A tensile elongation of the single metal filament may be 33 to 45%.

A surface resistance value of the rotary cleaning unit may be $1\times10^2$ to $1\times10^3\Omega/10$ cm.

A specific resistance value of the metal filament may be $1\times10^{-1}$ to $1\times10^{-2}\Omega/10$ cm.

Each of the fiber filament and the metal filament may be formed by twisting a bundle of threads.

The rotary cleaning unit may further include a fiber layer disposed to surround the outer circumferential surface of the nozzle body. The fiber layer may be provided with a plurality of planting portions spaced apart from each other such that the fiber filaments and the metal filaments are planted therein. Each of the planting portions may be provided with a hole and a bridge crossing the hole.

A center of the fiber filament and a center of the metal filament may be fixed to the bridge, and both ends of each of the fiber filament and the metal filament may extend away from a center of the nozzle body.

The rotary cleaning unit may further include a supporting portion supporting the fiber filaments and the metal filaments. The supporting portion may be disposed between the nozzle body and the fiber layer and formed by curing an adhesive.

The supporting portion may extend along a lengthwise, circumferential or spiral direction of the nozzle body.

The rotary cleaning unit may include a strap portion provided with the fiber filaments, and an antistatic portion provided with both the fiber filaments and the metal filaments.

The strap portion and the antistatic portion may extend along a lengthwise, circumferential, or spiral direction of the nozzle body.

The strap portion and the antistatic portion may have the same width.

The nozzle body may be formed of an extrusion-molded metal material.

The metal material may include aluminum.

The suction nozzle may include a support member inserted into at least one end portion of the nozzle body to rotatably support the nozzle body and formed of a material different from that of the nozzle body, and a bracket coupled to the end portion of the nozzle body to be in surface-contact with the support member.

A mutual contact surface between the support member and the bracket may be inclined with respect to the lengthwise direction of the nozzle body.

The support member may include a bearing installed around a shaft extending along the lengthwise direction of the nozzle body, and a bearing cover disposed to enclose the bearing and formed of a material different from that of the nozzle body, and the bracket may be disposed between the nozzle body and the bearing cover.

The bracket may include a nozzle body coupling portion having a circular shape to be coupled to the end portion of the nozzle body, an extending portion extending from the nozzle body coupling portion into the nozzle body along an inner circumferential surface of the nozzle body, and a surface-contact portion protruding from an inner circumferential surface of the nozzle body coupling portion to be in surface-contact with the bearing cover.

The extending portion and the surface-contact portion may be alternately arranged.

The support member may include a rotation supporting portion coupled to a side cover of the suction nozzle and inserted into one end portion of the nozzle body to rotatably support the nozzle body, and the bracket may be disposed between the nozzle body and the rotation supporting portion.

The bracket may include a nozzle body coupling portion having a circular shape to be coupled to the end portion of the nozzle body, an extending portion extending from the nozzle body coupling portion into the nozzle body along an inner circumferential surface of the nozzle body, and a shaft coupling portion extending from the extending portion toward the shaft so as to be coupled to a shaft that transmits a driving force generated from the driving unit to the nozzle body.

The nozzle body may be provided with a protrusion protruding from an inner circumferential surface of the nozzle body. The protrusion may extend along a lengthwise direction of the nozzle body, and the bracket may come in contact with the protrusion so as to press the protrusion in a rotating direction of the nozzle body.

DETAILED DESCRIPTION

Hereinafter, some embodiments of the present disclosure will be described in detail with reference to exemplary drawings. For the sake of brief description with reference to the drawings, the same or equivalent components may be provided with the same or similar reference numbers, and description thereof will not be repeated. In describing the present disclosure, if a detailed explanation for a related known function or construction is considered to unnecessarily divert the gist of the present disclosure, such explanation has been omitted but would be understood by those skilled in the art.

It will be understood that although the terms first, second, A, B, (a), (b), etc. may be used herein to describe various elements of the embodiments of the present disclosure. These terms are generally only used to distinguish one element from another, and nature, sequence or order of the element is not limited by the term. It will be understood that when an element is referred to as being “connected with” or “coupled to” another element, the element can be connected with the another element or intervening elements may also be present. In contrast, when an element is referred to as being "connected with" or "coupled to" another element, there are no intervening elements present.

Figure 1:
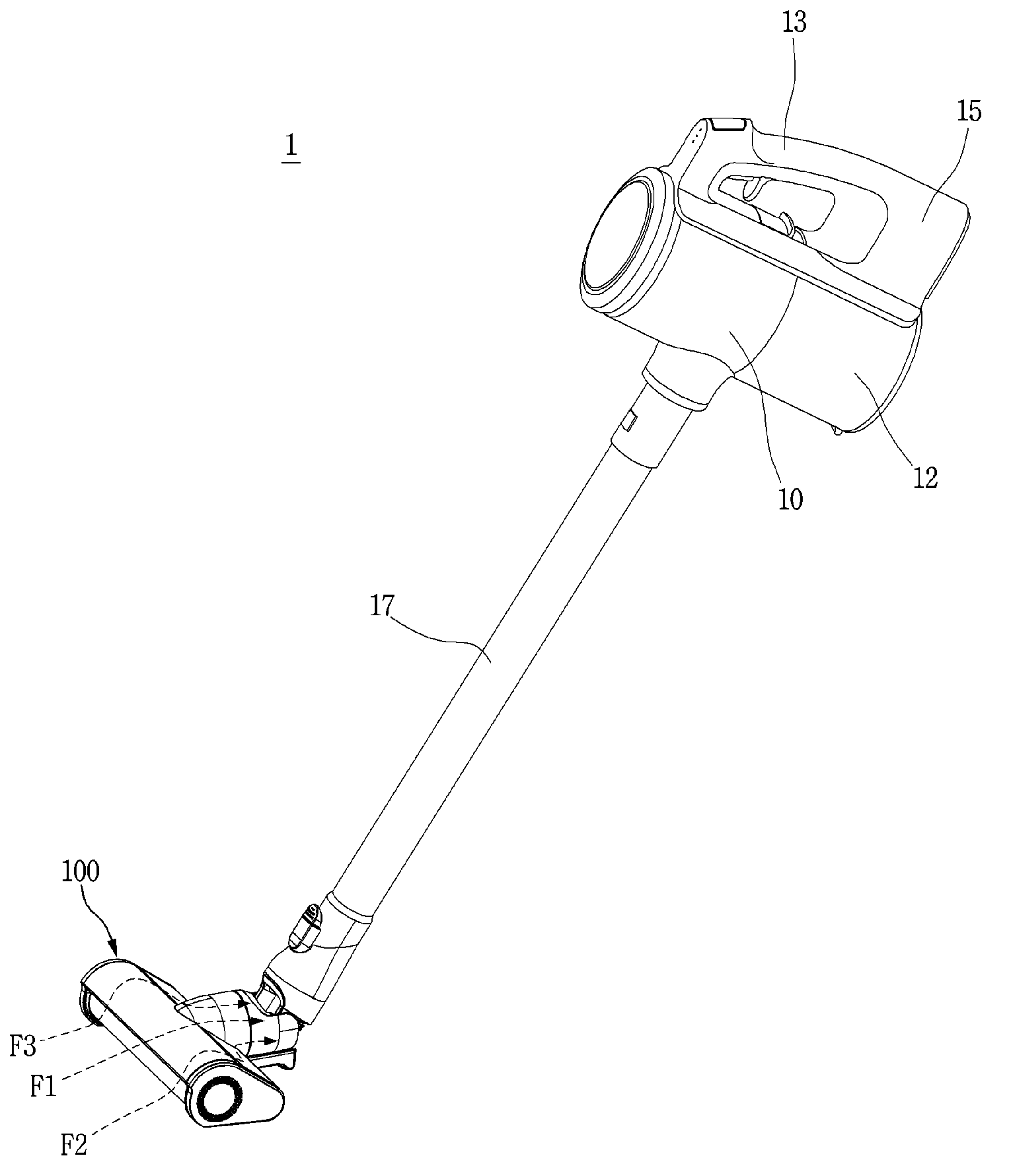
FIG. 1 is a perspective view of a vacuum cleaner in accordance with one embodiment of the present disclosure.

FIG. 1 is a perspective view of a vacuum cleaner in accordance with one embodiment of the present disclosure.

Referring to FIG. 1, a vacuum cleaner 1 according to an embodiment of the present disclosure may include a cleaner body 10 having a suction motor (not shown) therein for generating a suction force, a suction nozzle 100 through which air containing dust is sucked, and an extension pipe 17 connecting the suction nozzle 100 and the cleaner body 10 to each other.

Although not shown, the suction nozzle 100 may be directly connected to the cleaner body 10 without the extension pipe 17.

The cleaner body 10 may include a dust container 12 storing therein dust separated from air. Accordingly, the dust introduced through the suction nozzle 100 may be stored in the dust container 12 via the extension pipe 17.

A handle 13 which the user grips may be provided on an outside of the cleaner body 10. The user can perform cleaning while gripping the handle 13.

The cleaner body 10 may be provided with a battery (not shown), and the cleaner body 10 may be provided with a battery receiving portion 15 for receiving the battery therein. The battery receiving portion 15 may be provided in a lower portion of the handle 13. The battery (not shown) may be connected to the suction nozzle 100 to supply power to the suction nozzle 100.

Hereinafter, the suction nozzle 100 will be described in detail.

Figure 2:
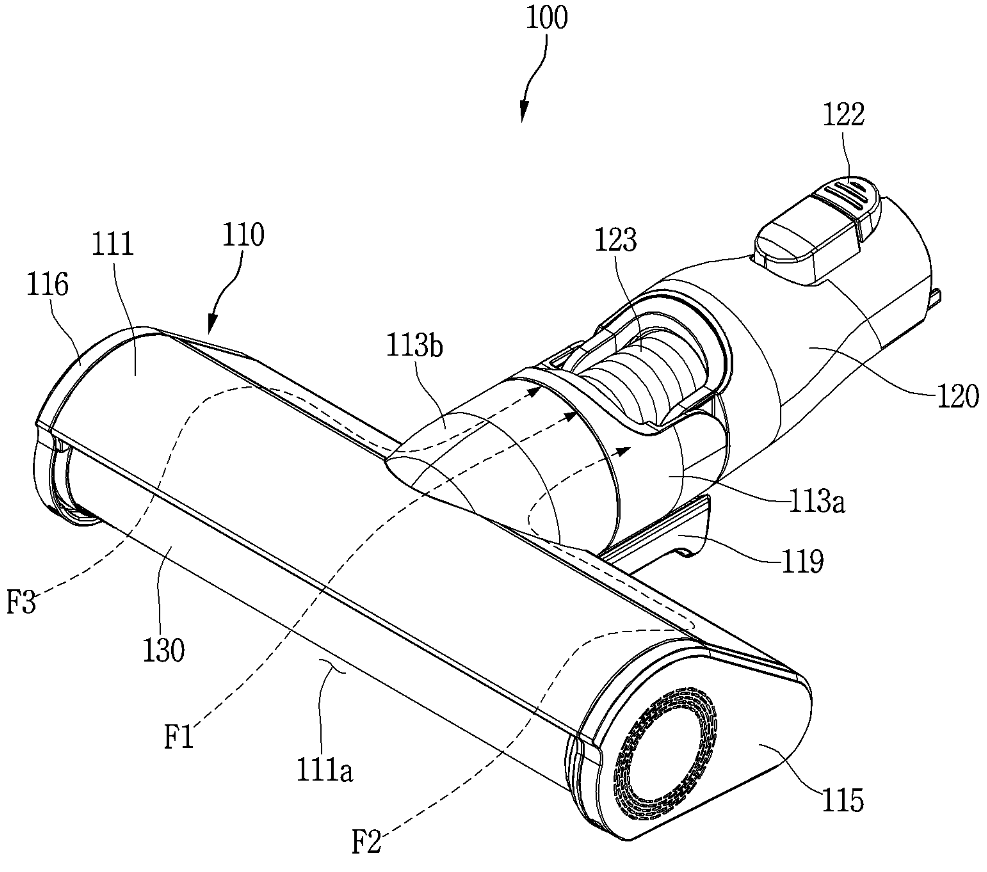
FIG. 2 is a perspective view of a suction nozzle of FIG. 1.
Figure 3:
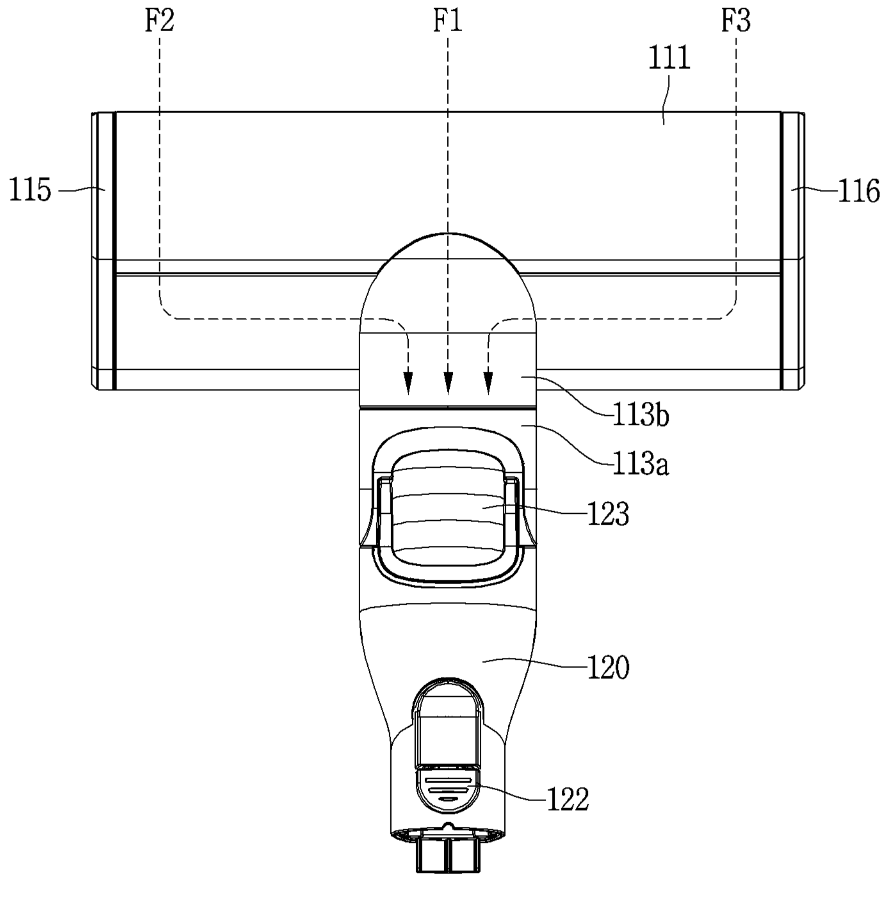
FIG. 3 is a planar view of the suction nozzle of FIG. 2.
Figure 4:
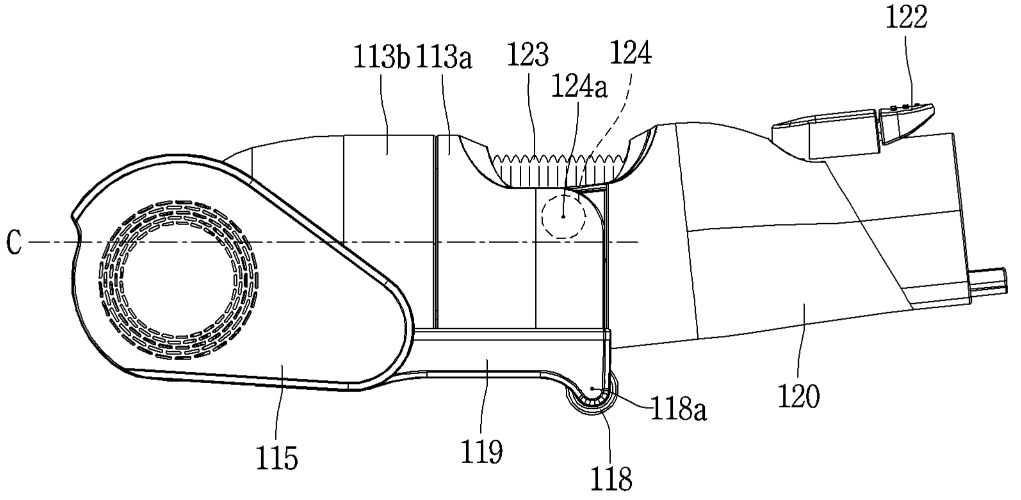
FIG. 4 is a lateral view of the suction nozzle of FIG. 1.
Figure 5:
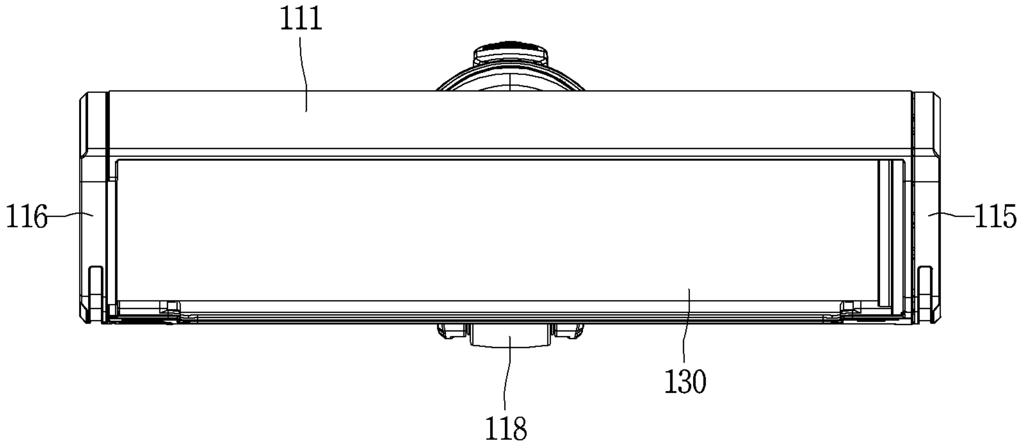
FIG. 5 is a front view of the suction nozzle of FIG. 1.
Figure 6:
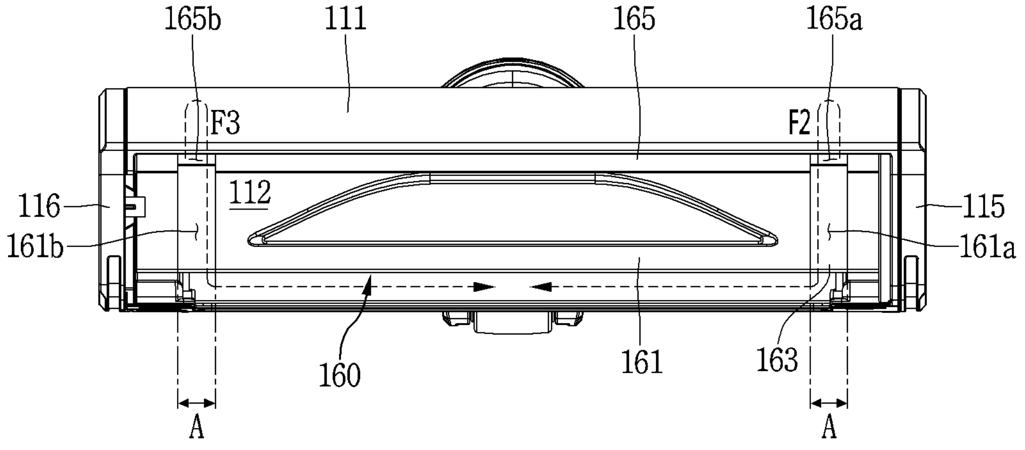
FIG. 6 is a view illustrating a state in which a rotary cleaning unit is detached from the suction nozzle of FIG. 5.
Figure 7:
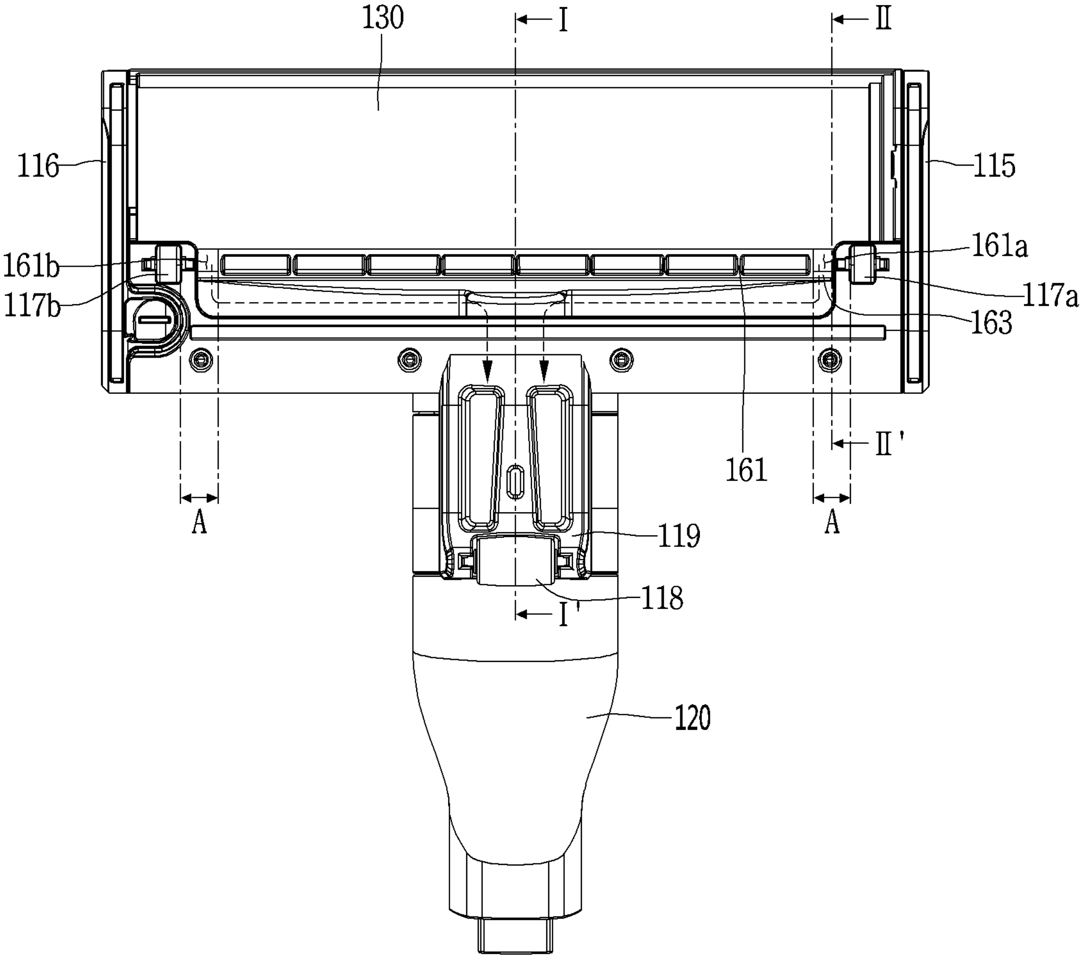
FIG. 7 is a bottom view of the suction nozzle of FIG. 1.
Figure 8:
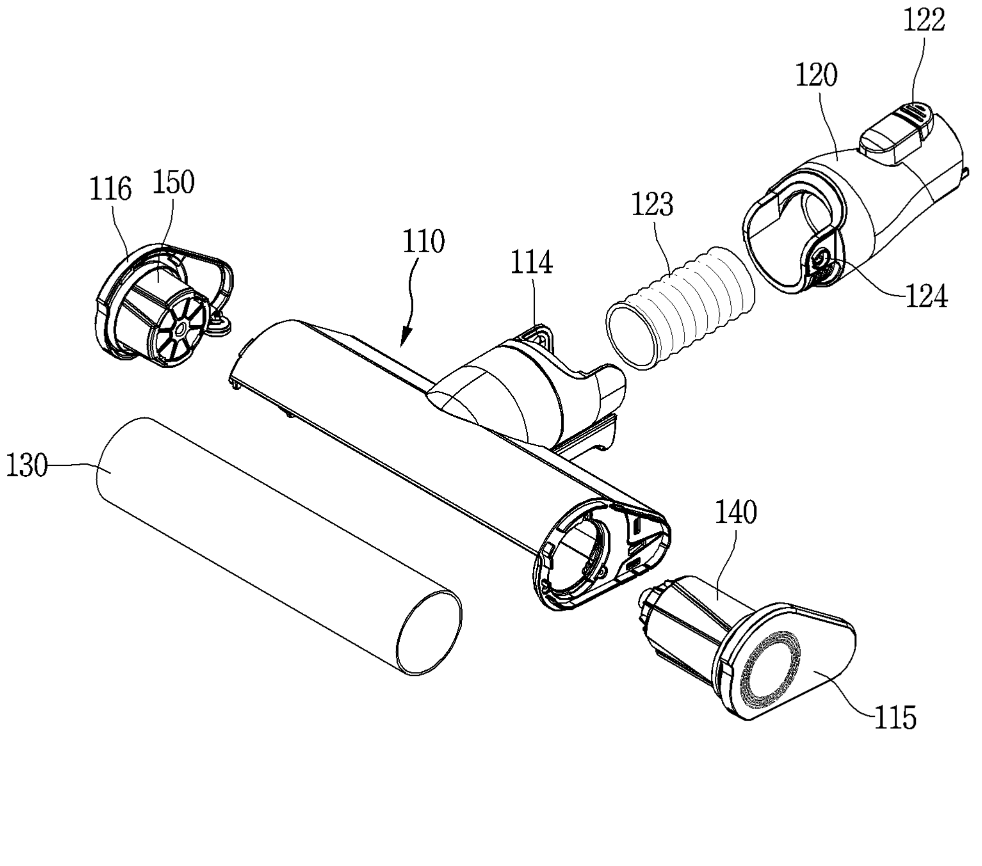
FIG. 8 is an exploded perspective view of the suction nozzle of FIG. 1.
Figure 9:
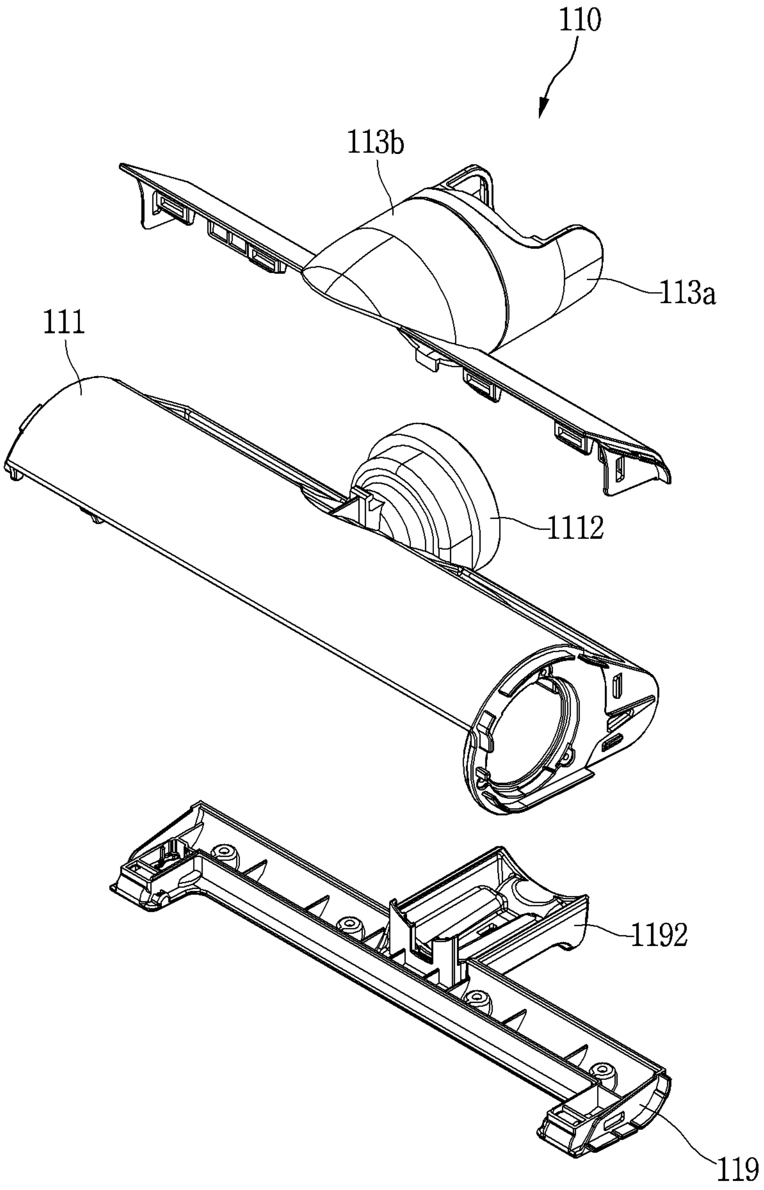
FIG. 9 is an exploded perspective view of a housing.
Figure 10:
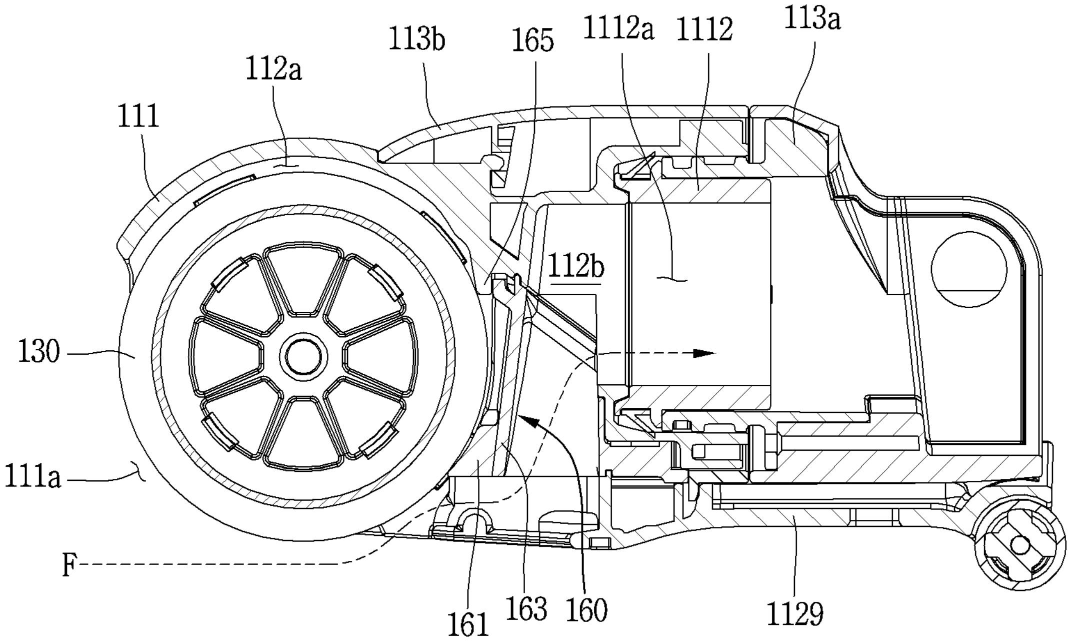
FIG. 10 is a sectional view of the suction nozzle cut along the line I-I' of FIG. 7.
Figure 11:
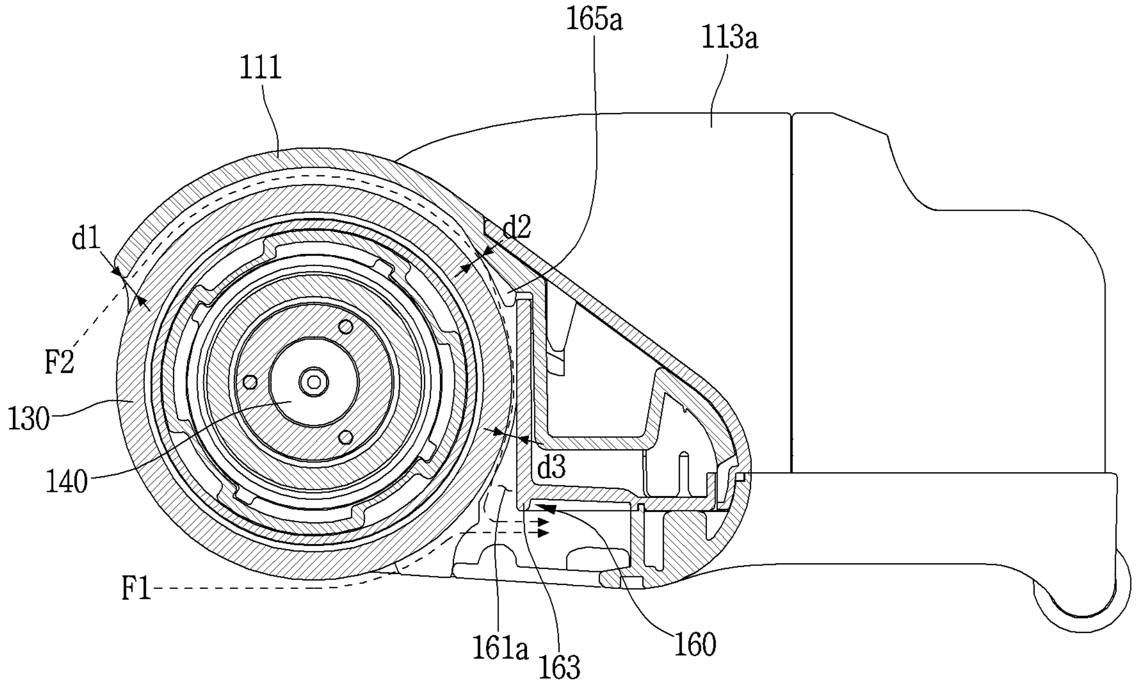
FIG. 11 is a sectional view taken along the line II-II' of FIG. 7.

FIG. 2 is a perspective view of a suction nozzle of FIG. 1, FIG. 3 is a planar view of the suction nozzle of FIG. 2, FIG. 4 is a lateral view of the suction nozzle of FIG. 1, FIG. 5 is a front view of the suction nozzle of FIG. 1, FIG. 6 is a view illustrating a state in which a rotary cleaning unit is detached from the suction nozzle of FIG. 5, FIG. 7 is a bottom view of the suction nozzle of FIG. 1, FIG. 8 is an exploded perspective view of the suction nozzle of FIG. 1, FIG. 9 is an exploded perspective view of a housing, FIG. 10 is a sectional view of the suction nozzle cut along the line I-I' of FIG. 7, and FIG. 11 is a sectional view taken along the line II-II' of FIG. 7.

Referring to FIGS. 2 to 11, the suction nozzle 100 includes a housing 110, a connection pipe 120, and a rotary cleaning unit 130.

The housing 110 includes a body portion 111 in which a chamber 112 is formed. The body portion 111 may be provided with a front opening 111*a* through which air containing contaminants is sucked. The air introduced through the front opening 111*a* by a suction force generated in the cleaner body 10 may be moved to the connection pipe 120 via the chamber 112.

The front opening 111*a* extends in a left and right direction of the housing 110. The front opening 111*a* may extend even up to the front of the housing 110 as well as the bottom of the housing 110. This may result in securing a sufficient suction area, thereby evenly cleaning even a portion of a floor adjacent to a wall surface.

The housing 110 may further include an internal pipe 1112 communicating with the front opening 111*a*. The suction force generated in the cleaner body 10 may allow external air to move into an inner flow path 1112*a* of the internal pipe 1112 through the front opening 111*a*.

The housing 110 may further include a driving unit 140 for supplying a driving force for rotating the rotary cleaning unit 130. The driving unit 140 may be inserted into one side of the rotary cleaning unit 130 to supply the driving force to the rotary cleaning unit 130. The driving unit 140 will be described in detail with reference to FIG. 12.

The rotary cleaning unit 130 may be accommodated in the chamber 112 of the body portion 111. At least part of the rotary cleaning unit 130 may be externally exposed through the front opening 111*a*. The rotary cleaning unit 130 may rub against the floor while being rotated by the driving force transferred from the driving unit 140, thereby shaking out (sweeping, scraping) contaminants. In addition, an outer circumferential surface of the rotary cleaning unit 130 may be made of fabric such as cotton flannel or a felt material. Accordingly, while the rotary cleaning unit 130 rotates, foreign substances such as dust accumulated on the floor may be stuck in the outer circumferential surface of the rotary cleaning unit 130 so as to be effectively removed.

The body portion 111 may cover at least part of an upper side of the rotary cleaning unit 130. An inner circumferential surface of the body portion 111 may have a curved shape to correspond to the shape of the outer circumferential surface of the rotary cleaning unit 130. Accordingly, the body portion 111 can perform a function of preventing foreign substances, which are swept from the floor while the rotary cleaning unit 1309 rotates, from being moved upward.

The housing 110 may further include side covers 115 and 116 covering both sides of the chamber 112. The side covers 115 and 116 may be provided on both side surfaces of the rotary cleaning unit 130.

The side covers 115 and 116 include a first side cover 115 disposed on one side of the rotary cleaning unit 130 and a second side cover 116 disposed on another side of the rotary cleaning unit 130. The first side cover 115 may be fixedly coupled with the driving unit 140.

The suction nozzle 100 further includes a rotation supporting portion 150 provided on the second side cover 116 to rotatably support the rotary cleaning unit 130. The rotation supporting portion 150 may be inserted into another side of the rotary cleaning unit 130 so as to rotatably support the rotary cleaning unit 130.

The rotary cleaning unit 130 may rotate in a counterclockwise direction with reference to the sectional view of FIG. 10. That is, the rotary cleaning unit 130 rotates in a manner of pushing foreign substances or impurities from a contact point with the floor toward the internal pipe 112. Accordingly, the foreign substances swept away from the floor by the rotary cleaning unit 130 move toward the internal pipe 1112, and are sucked into the internal pipe 1112 by the suction force. As the rotary cleaning unit 130 rotates backward with respect to the contact point with the floor, cleaning efficiency can be improved.

The chamber 112 may be provided with a partition member 160. The partition member 160 may extend from top to bottom of the housing 110.

The partition member 160 may be provided between the rotary cleaning unit 130 and the internal pipe 1112. The partition member 160 may divide the chamber 112 of the housing 110 into a first region 112*a* in which the rotary cleaning unit 130 is provided and a second region 112*b* in which the internal pipe 1112 is provided. As illustrated in FIG. 10, the first region 112*a* may be provided in a front portion of the chamber 212, and the second region 112*b* may be provided in a rear portion of the chamber 212.

The partition member 160 may be provided with a first extending wall 161. The first extending wall 161 may extend such that at least part thereof is brought into contact with the rotary cleaning unit 130. Accordingly, when the rotary cleaning unit 130 rotates, the first extending wall 161 may rub against the rotary cleaning unit 130 to sweep away foreign substances stuck in the rotary cleaning unit 130.

The first extending wall 161 may extend along a rotating shaft of the rotary cleaning unit 130. That is, a contact point between the first extending wall 161 and the rotary cleaning unit 130 may be formed along the rotating shaft of the rotary cleaning unit 130. Accordingly, the first extending wall 161 can remove foreign substances stuck in the rotary cleaning unit 130 and simultaneously prevent the foreign substances on the floor from being introduced into the first region 112*a* of the chamber 112. As the foreign substances are prevented from being introduced into the first region 112*a* of the chamber 112, the foreign substances can be prevented from being discharged to the front of the housing 110 through the front opening 111*a* due to the rotation of the rotary cleaning unit 130.

In addition, the first extending wall 161 can prevent hair or yarn stuck in the rotary cleaning unit 130 from being introduced into the first region 112*a* of the chamber 112, so as to prevent such hair or yarn from being tangled around the rotary cleaning unit 130. That is, the first extending wall 161 may perform an anti-tangle function.

The partition member 160 may further be provided with a second extending wall 165. The second extending wall 165, similar to the first extending wall 161, may extend such that at least part thereof is brought into contact with the rotary cleaning unit 130. Accordingly, when the rotary cleaning unit 130 rotates, the second extending wall 165 may rub against the rotary cleaning unit 130 like the first extending wall 161 so as to sweep away the foreign substances stuck in the rotary cleaning unit 130. On the other hand, the second extending wall 165 has the same function as the first extending wall 161 and the function of sweeping away the foreign substances stuck in the rotary cleaning unit 130 can be executed only by the first extending wall 161 without the second extending wall 165. Therefore, the second extending wall 165 may not be included in the structure of the housing 110.

The second extending wall 165 may be disposed higher than the first extending wall 161. Accordingly, the second extending wall 165 has a function of secondarily separating foreign substances which have not been removed from the rotary cleaning unit 130 by the first extending wall 161.

Hereinafter, a flow of air inside the housing 110 will be described.

A plurality of suction flow paths F1, F2 and F3 are formed in the body portion 111 of the suction nozzle 100 such that external air flows into the internal pipe of the body portion 111.

The plurality of suction flow paths F1, F2 and F3 include a lower flow path F1 formed in a lower side of the rotary cleaning unit 130, and upper flow paths F2 and F3 formed in an upper side of the rotary cleaning unit 130.

The lower flow path F1 is formed in the lower side of the rotary cleaning unit 130. Specifically, the lower flow path F1 is connected from the front opening 111*a* to the inner flow path 1112*a* via the lower side of the rotary cleaning unit 130 and the second region 112*b*.

The upper flow paths F2 and F3 are formed in the upper side of the rotary cleaning unit 130. Specifically, the upper flow paths F2 and F3 may be connected to the inner flow path 1112*a* via the upper side of the rotary cleaning unit 130 within the first region 112*a* and the second region 112*b*. Accordingly, the upper flow paths F2 and F3 may join the lower flow path F1 in the second region 112*b*.

The upper flow paths F2 and F3 include a first upper flow path F2 formed in one side of the housing 110 and a second upper flow path F3 formed in another side of the housing 110. Specifically, the first upper flow path F2 is disposed adjacent to the first side cover 115, and the second upper flow path F3 is disposed adjacent to the second side cover 116.

To form the first upper flow path F2, a first lower groove 161*a* may be formed in the first extending wall 161 and a first upper groove 165*a* may be formed in the second extending wall 165.

The first lower groove 161*a* is formed by recessing a part of an inner circumferential surface of the first extending wall 161, that is, a surface of the first extending wall 161 which is in contact with the rotary cleaning unit 130. In addition, the first lower groove 161*a* may extend along a circumferential direction of the rotary cleaning unit 130.

The first upper groove 165*a* is formed by recessing a part of an inner circumferential surface of the second extending wall 165, that is, a surface of the second extending wall 165 which is in contact with the rotary cleaning unit 130. The first upper groove 165*a* may extend along the circumferential direction of the rotary cleaning unit 130.

The first lower groove 161*a* is connected to the first upper groove 165*a* and the first upper flow path F2 is formed along the first lower groove 161*a* and the first upper groove 165*a*. Meanwhile, when the suction nozzle 100 is not provided with the second extending wall 165, the first upper flow path F2 may be formed only by the first lower groove 161*a*.

The first lower groove 161*a* and the first upper groove 165*a* may be formed to surround the driving unit 140. The first upper flow path F2 may be formed to surround at least part of the driving unit 140 along a periphery of the driving unit 140. The driving unit 140 may be cooled by air which flows along the first upper flow path F2.

The first lower groove 161*a* and the first upper groove 165*a* may have the same width A in the left and right direction, as illustrated, but the present disclosure is not limited to this feature. The width A of each of the first lower groove 161*a* and the first upper groove 165*a* in the left and right direction may have a predetermined value. When the width A in the left and right direction is small, the width of the first upper flow path F2 is narrowed. Accordingly, a flow rate of air may be reduced or a flow of air may be blocked so as to cause an insignificant cooling performance of the driving unit 140. On the other hand, when the width A in the left and right direction is large, the width of the first upper flow path F2 is increased and accordingly the flow rate of air may be increased. However, an anti-tangle function of hair or the like of the rotary cleaning unit 130 by the first extending wall 161 and the second extending wall 165 may be degraded. Therefore, the width A in the left and right direction should have an appropriate value, and may be smaller than a length of the driving unit. For example, the width A of the first upper groove 165*a* in the left and right direction may be 5 to 10 mm, but is not limited thereto.

As illustrated in FIG. 11, a spaced distance between the inner circumferential surface of the chamber 112 and the upper side of the rotary cleaning unit 130 in the first upper flow path F2 may become narrower toward the inner side of the chamber 112. Specifically, the spaced distance between the inner circumferential surface of the chamber 112 and the upper side of the rotary cleaning unit 130 is d1 at the side of the front opening 111*a*, d2 at the first upper groove 165*a*, and d3 at the first lower groove 161*a*. The spaced distance has a smaller value from d1 to d3 (d1>d2>d3). For example, d1 may be 3 mm, d2 may be 2.7 mm, and d3 may be 2 mm. With such a feature, a flow rate of air may be reduced toward the front opening 111*a* in the upper side of the rotary cleaning unit 130, which may prevent foreign substances from being discharged to the front due to the rotation of the rotary cleaning unit 130.

Hereinafter, the second upper flow path F3 will be described. To form the second upper flow path F3, a second lower groove 161*b* is formed in the first extending wall 161 and a second upper groove 165*b* is formed in the second extending wall 165.

The second lower groove 161*b* is formed at a position adjacent to the second side cover 116 on the inner circumferential surface of the first extending wall 161, that is, a surface of the first extending wall 161 which is in contact with the rotary cleaning unit 130. The second lower groove 161*b* is different from the first lower groove 161*a* in position where the second lower groove 161*b* is formed, and the remaining components are substantially the same.

The second upper groove 165*b* is formed at a position adjacent to the second side cover 116 on the inner circumferential surface of the second extending wall 165, that is, the surface of the second extending wall 165 which is in contact with the rotary cleaning unit 165. The second upper groove 165*b* is connected to the second lower groove 161*b* and the second upper flow path F3 is formed along the second lower groove 161*b* and the second upper groove 165*b*. On the other hand, when the suction nozzle 100 is not provided with the second extending wall 165, the second upper flow path F3 may be formed only by the second lower groove 161*b*.

The second lower groove 161*b* and the second upper groove 165*b* may be formed to surround the rotation supporting portion 150. Accordingly, the second upper flow path F3 may be formed along a periphery of the rotation supporting portion 150, and the rotation supporting portion 150 may be cooled by air which flows along the second upper flow path F3.

The second lower groove 161*b* and the second upper groove 165*b* may have the same width A in the left and right direction, but the present disclosure is not limited to this feature. The width A of each of the second lower groove 161*b* and the second upper groove 165*b* in the left and right direction may be the same as the width A of each of the first lower groove 161*a* and the first upper groove 165*a* in the left and right direction. A spaced distance between the inner circumferential surface of the chamber 112 and the upper side of the rotary cleaning unit 130 in the second upper flow path F3 may be decreased toward the inner side of the chamber 112, similar to that in the first upper flow path F2. Therefore, detailed description thereof will be omitted.

The partition member 160 may further be provided with a third extending wall 163 that is coupled to the first extending wall 161. The third extending wall 163 may be coupled to a rear surface of the first extending wall 161 to support the first extending wall 161. As the first lower groove 161*a* and the second lower groove 161*b* are formed in the first extending wall 161, the third extending wall 163 may be partially exposed at the first region 112*a* of the chamber 112.

As such, the housing 110 is provided with not only the lower flow path F1 provided in the lower side of the rotary cleaning unit 130 but also the first upper flow path F2 provided in the upper side of the rotary cleaning unit 130, which may result in efficiently cooling the driving unit 140. The housing 110 is also provided with the second upper flow path F3, which may result in efficiently cooling the rotation supporting portion 150.

The connection pipe 120 may connect the housing 110 and the extension pipe 17 (see FIG. 1). That is, one side of the connection pipe 120 is connected to the housing 110 and another side of the connection pipe 120 is connected to the extension pipe 17.

The connection pipe 120 may be provided with a detachable button 122 for manipulating mechanical coupling with the extension pipe 17. The user can couple or separate the connection pipe 120 and the extension pipe 17 by manipulating the detachable button 122.

The connection pipe 120 may be rotatably connected to the housing 110. Specifically, the connection pipe 120 may be hinge-coupled to a first connection member 113*a* so as to be vertically rotatable.

The housing 110 may be provided with connection members 113*a* and 113*b* for hinge-coupling with the connection pipe 120. The connecting members 113*a* and 113*b* may be formed to surround the internal pipe 1112. The connection members 113*a* and 113*b* may include a first connection member 113*a* and a second connection member 113*b* which are directly connected to the connection pipe 120. One side of the second connection member 113*b* may be coupled to the first connection member 113*a* and another side of the second connection member 113*b* may be coupled to the body portion 111.

As illustrated in FIG. 8, a hinge hole 114 is formed in the first connection member 113*a*, and a hinge shaft 124 inserted into the hinge hole 114 may be provided on the connection pipe 120. However, unlike the illustrated embodiment, a hinge hole may be formed in the connection pipe 120 and a hinge shaft may be formed on the first connection member 113*a*. The hinge hole 114 and the hinge shaft 124 may collectively be referred to as "hinge portion."

A center 124*a* of the hinge shaft 124 may be disposed higher than a center axis C of the first connection member 113*a*. Accordingly, a rotation center of the connection pipe 120 may be formed higher than the center axis C of the first connection member 113*a*.

The first connection member 113*a* may be rotatably connected to the second connection member 113*b*. Specifically, the first connection member 113*a* may be rotatable along a lengthwise direction as a rotation axis.

The suction nozzle 100 may further include an auxiliary hose 123 connecting the connection pipe 120 and the internal pipe 1112 of the housing 110 to each other.

Accordingly, air introduced into the housing 110 may flow toward the cleaner body 10 (see FIG. 1) along the auxiliary hose 123, the connection pipe 120, and the extension pipe 17 (see FIG. 1).

The auxiliary hose 123 may be made of a flexible material so that the connection pipe 120 can rotate. In addition, the first connection member 113*a* may have a shape of enclosing at least part of the auxiliary hose 123 to protect the auxiliary hose 123.

The suction nozzle 100 may further include front wheels 117*a* and 117*b* for movement during cleaning. The front wheels 117*a* and 117*b* may be rotatably provided on a bottom surface of the housing 110. The front wheels 117*a* and 117*b* may be provided as a pair located at both sides of the front opening 111*a* and may be disposed at the rear of the front opening 111*a*.

The suction nozzle 100 may further include a rear wheel 118. The rear wheel 118 may be rotatably provided on the bottom surface of the housing 110 and disposed behind the front wheels 117*a* and 117*b*.

The housing 110 may further include a support member 119 provided at the lower side of the body portion 111. The support member 119 may support the body portion 111. The front wheels 117*a* and 117*b* may be rotatably coupled to the support member 119.

The support member 119 may be provided with an extending portion 1192 extending to the rear thereof. The extending portion 1192 may be rotatably coupled to the rear wheel 118. In addition, the extending portion 1192 may support the first connection member 113*a* and the second connection member 113*b* at a lower side of them.

A rotating shaft 118*a* of the rear wheel 118 may be disposed at the rear relative to the center 124*a* of the hinge shaft 124. This may result in improving stability of the housing, thereby preventing the housing 110 from being overturned during cleaning.

Hereinafter, the detailed configuration of the driving unit 140 will be described.

Figure 12:
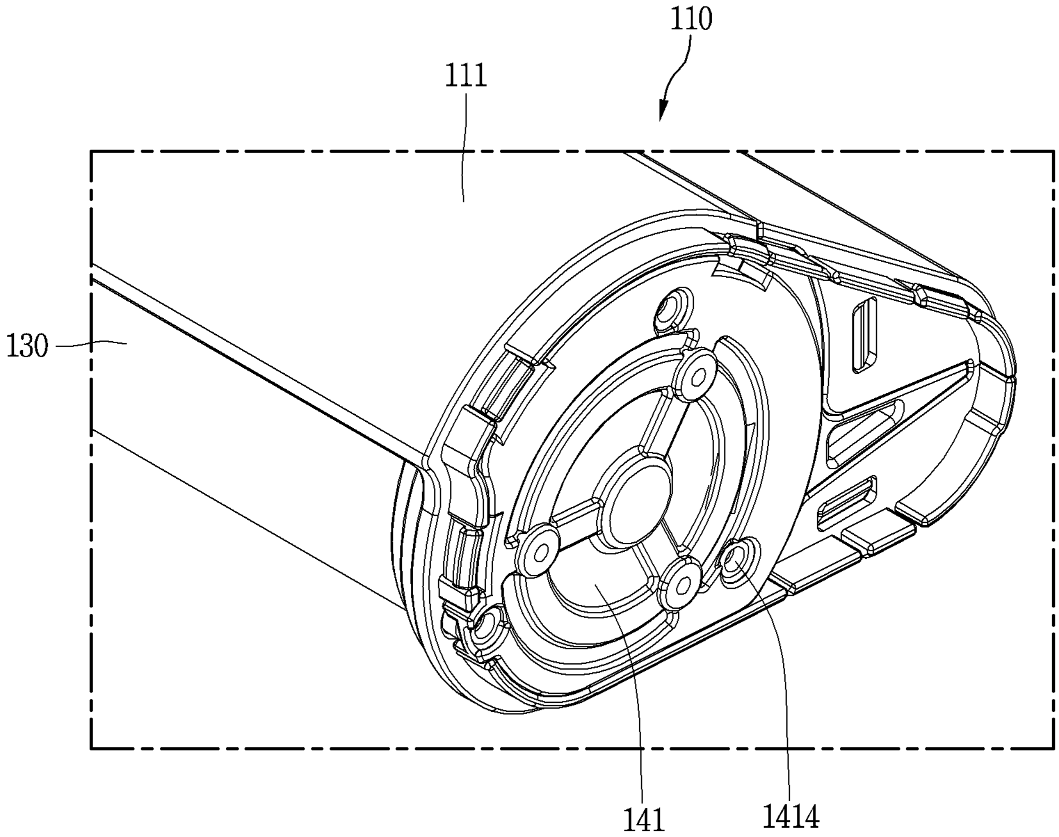
FIG. 12 is a view illustrating a state in which a first side cover of a suction nozzle is removed.
Figure 13:
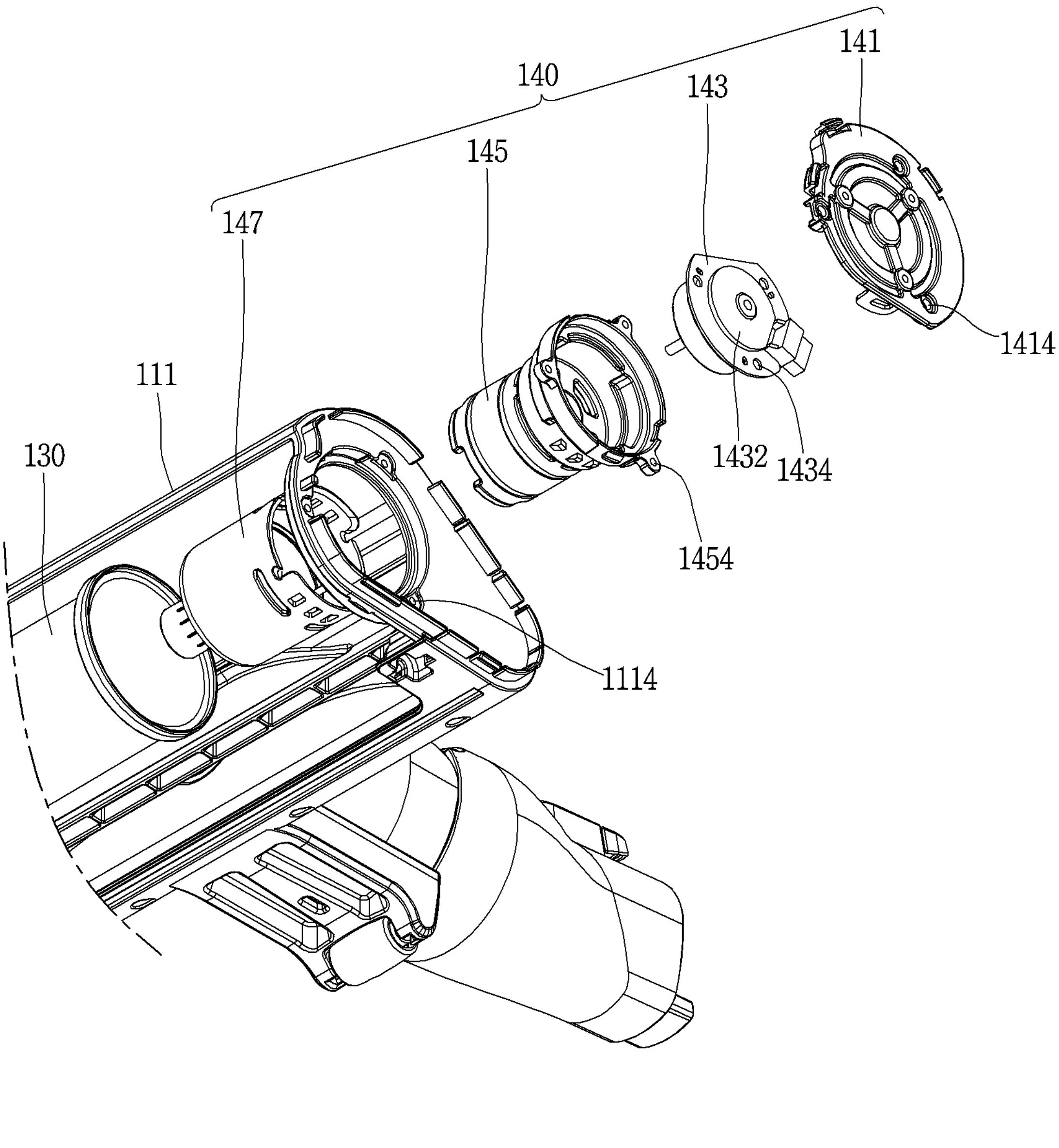
FIG. 13 is an exploded perspective view of a driving unit.
Figure 14:
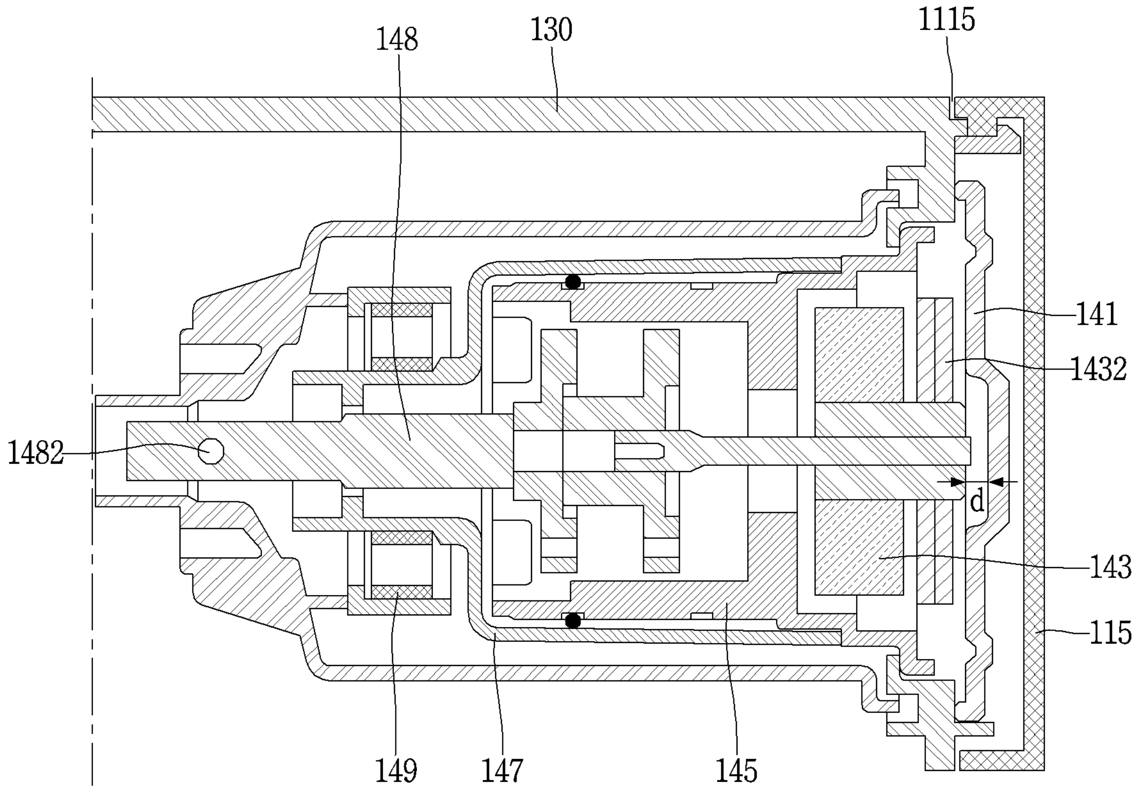
FIG. 14 is a sectional view illustrating the driving unit cut along a rotating shaft of a rotary cleaning unit.

FIG. 12 is a view illustrating a state in which a first side cover of a suction nozzle has been removed, FIG. 13 is an exploded perspective view of the driving unit, and FIG. 14 is a sectional view illustrating the driving unit cut along the rotating shaft of the rotary cleaning unit.

Referring to FIGS. 12 to 14, the driving unit 140 for rotating the rotary cleaning unit 130 is coupled to the body portion 111 of the housing 110. At least part of the driving unit may be inserted into one side of the rotary cleaning unit 130.

The driving unit 140 includes a motor 143 for generating a driving force and a motor supporter 141. The motor 143 may include a BLDC motor. A printed circuit board (PCB) 1432 for controlling the motor 143 may be provided on one side of the motor 143.

The motor 143 may be coupled to the motor supporter 141 by coupling members such as bolts. The motor 143 may be provided with coupling holes 1434 for coupling with the motor supporter 141 using the bolts.

The driving unit 140 may further include a gear portion 145 for transmitting the driving force of the motor 143.

The motor 143 may be inserted into the gear portion 145. For this purpose, a hollow may be formed inside the gear portion 145. The gear portion 145 may be coupled to the motor supporter 141 by bolts. For this purpose, coupling holes 1454 may be formed in one side of the gear portion 145. The gear portion 145 and the motor 143 may be integrally coupled to the motor supporter 141 so as to reduce generation of vibration during an operation of the motor 143.

The motor supporter 141 may be made of polycarbonate. The polycarbonate material is characterized in view of high insulation and impact resistance. Therefore, the motor supporter 141 can be strong against external impact and prevent externally-generated static electricity and the like from being transferred to the motor 143.

Also, an inner circumferential surface of the motor supporter 141 is spaced apart from the PCB 1432 of the motor 143. Accordingly, even when static electricity generated in the body portion 111 is transmitted to the driving unit 140, the static electricity can be naturally discharged without reaching up to the PCB 1432 of the motor 143, which may result in protecting the PCB 1432 of the motor 143.

The motor supporter 141 is spaced apart from an inner circumferential surface of the first side cover 115. Accordingly, a cooling flow path for cooling the driving unit 140 can be secured.

The driving unit 140 may further include a cover portion 147 enclosing the gear portion 145. The cover portion 147 has a function of protecting the gear portion 145.

The driving unit 140 further includes a shaft 148 connected to the gear portion 145 and the shaft 148 is connected to the rotary cleaning unit 130. The shaft 148 may transfer the driving force transmitted through the gear portion 145 to the rotary cleaning unit 130. Accordingly, the rotary cleaning unit 130 can rotate.

The driving unit 140 may further include a bearing 149 mounted on the cover portion 147. The bearing 149 may be connected to the shaft 148 to fix the shaft 148 at a predetermined position and may rotate the shaft 148 while supporting a weight of the shaft 148 itself and a load applied to the shaft 148. Accordingly, the shaft 148 can rotate smoothly.

The shaft 148 includes a fixing member 1482 fixed to the rotary cleaning unit 130. Accordingly, the shaft 148 can rotate together with the rotary cleaning unit 130 in the fixed state. Therefore, the shaft 148 can rotate the rotary cleaning unit 130 by using the driving force transmitted by the motor 143 and the gear portion 145.

Hereinafter, the configuration of the rotary cleaning unit 130 that can prevent static electricity from being transmitted to the user will be described.

Figure 15:
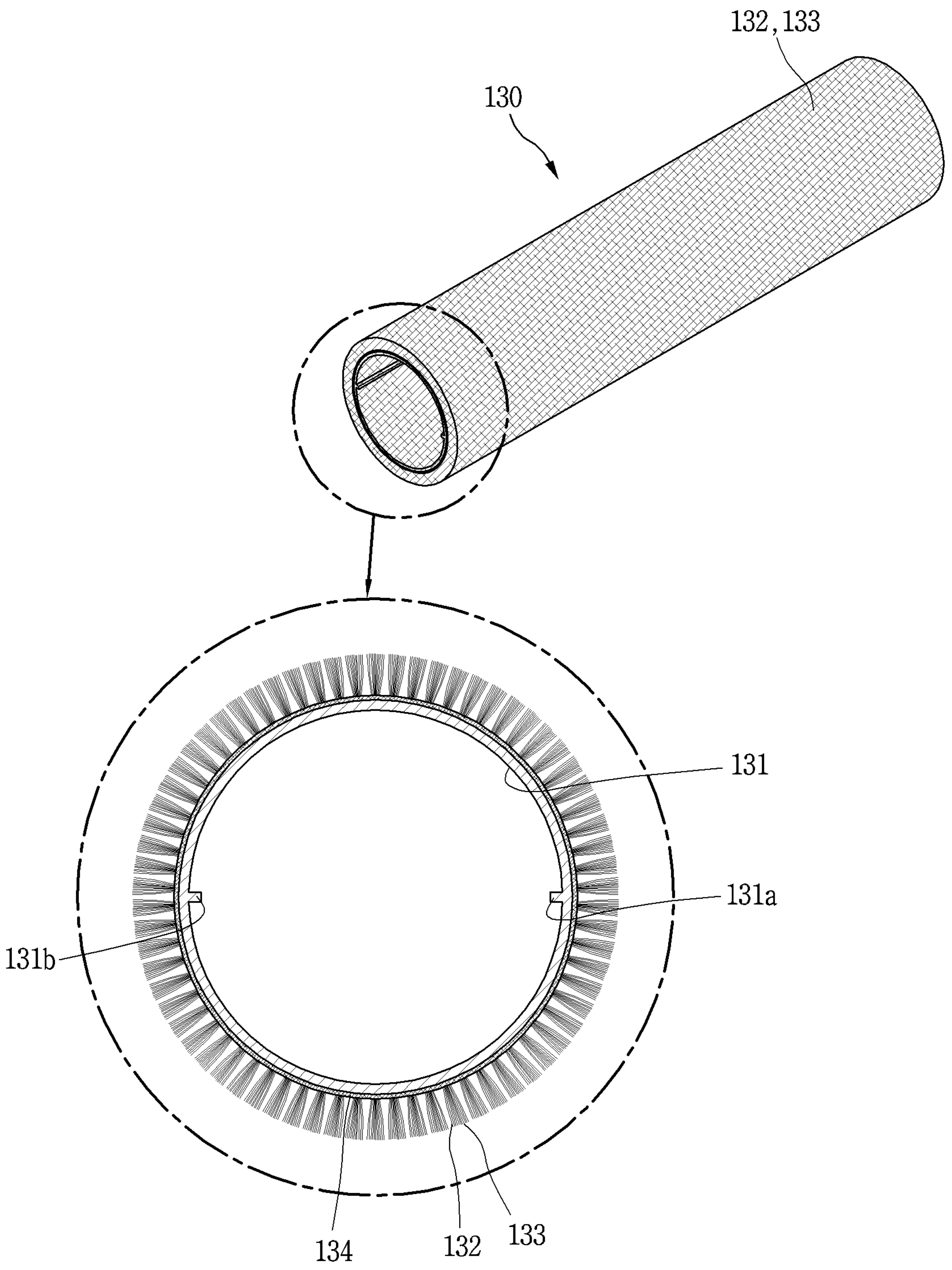
FIG. 15 is a conceptual view illustrating an example of the rotary cleaning unit.

FIG. 15 is a conceptual view illustrating an example of the rotary cleaning unit 130.

The rotary cleaning unit 130 includes a nozzle body 131, a fiber layer 134, fiber filaments 132, and metal filaments 133.

The nozzle body 131 has a hollow cylindrical shape. The hollow of the nozzle body 131 is formed along a direction of the rotating shaft of the rotary cleaning unit 130.

The nozzle body 131 is rotatably installed inside the housing 110 (see FIG. 2, etc.). The nozzle body 131 is provided with at least one protrusion 131*a*, 131*b* on an inner circumferential surface thereof. The protrusion 131*a*, 131*b* of the nozzle body 131 is engaged with the driving unit 140 (see FIG. 13) when the rotary cleaning unit 130 is installed inside the housing. Accordingly, the nozzle body 131 may receive a rotational driving force from the driving unit 140.

The nozzle body 131 may be formed of a metal (extruded material) or plastic material (injected material), but the material of the nozzle body 131 is not particularly limited in the present disclosure. The metal may be extruded into the shape of the nozzle body. Extrusion refers to a molding method of producing a product with a predetermined sectional area by injecting a raw material and pressing it in one direction. On the other hand, the plastic may be injected into the shape of the nozzle body 131. Injection refers to a molding method of producing a product according to a shape of a mold by injecting a raw material into one of an upper mold and a lower mold and pressing it using the other.

Since the nozzle body 131 rotates at a high speed, minimum durability must be ensured. A minimum thickness of the nozzle body 131 for ensuring the minimum durability may vary depending on a material. Here, the thickness of the nozzle body 131 refers to a difference between an outer radius and an inner radius of the nozzle body.

Intensity of the plastic is weaker than that of the metal. Therefore, a minimum thickness of the plastic for ensuring the minimum durability should be greater than a minimum thickness of the metal. When the minimum thickness of the nozzle body 131 is great, the weight of the nozzle body 131 becomes relatively heavy and accordingly a load applied to the motor 143 (see FIG. 12) for rotating the nozzle body 131 also increases. Also, the increased thickness of the nozzle body 131 causes an increase in material costs.

In this respect, the nozzle body 131 is preferably formed of a metal material rather than a plastic material. Particularly, since the aluminum-extruded product is light in weight and has sufficient intensity among metals, it is suitable as the material of the nozzle body 131.

The fiber layer 134 is formed to surround the outer circumferential surface of the nozzle body 131. In this case, depending on design, the rotary cleaning unit 130 may not be provided with the fiber layer 134, and in this case, the fiber filaments 132 and the metal filaments 133 may be coupled directly to the outer circumferential surface of the nozzle body 131.

The fiber filaments 132 and the metal filaments 133 are disposed on the outer circumferential surface of the nozzle body 131. The metal filament 133 is an organic conductive fiber. The fiber filaments 132 and the metal filaments 133 may be coupled to the nozzle body 131 or to the fiber layer 134. FIG. 15 illustrates a configuration in which the fiber filaments 132 and the metal filaments 133 are planted on the fiber layer 134.

The fiber filaments 132 and the metal filaments 133 planted on the fiber layer 134 may be randomly arranged. The fiber filaments 132 may be fully planted without any distinction or unity, and the metal filaments 133 may be sparsely planted between the fiber filaments 132. A number ratio or area ratio between the fiber filaments 132 and the metal filaments 133 will be described later.

The fiber filaments 132 and the metal filaments 133 extend in a direction away from the center of the nozzle body 131. When the nozzle body 131 is rotated by the rotational driving force transmitted from the driving unit, the fiber filaments 132 and the metal filaments 133 rotate together with the nozzle body 131. The fiber filaments 132 and the metal filament 133 collide with a floor or a carpet such that debris, dust, etc. existing on the floor or the carpet can be swept out.

When the rotary cleaning unit 130 rotates, the fiber filaments 132 and the floor (or the carpet) to be cleaned collide with each other, and static electricity due to friction is generated during the collision. If only the fiber filaments 132 are provided on the outer circumferential surface of the rotary cleaning unit 130 without the metal filaments 133, static electricity is transferred even to the handle 13 (see FIG. 1) or the user along the cleaner body 10 (see FIG. 1) or a wire in the cleaner body 10.

However, when the metal filaments 133 are provided on the rotary cleaning unit 130 as illustrated in the present disclosure, the metal filaments 133 having conductivity may allow the static electricity generated by the fiber filaments 132 to be discharged or eliminated therethrough. Since the metal filaments 133 serve as a charging path connected to the floor or carpet or serve to remove static electricity, the static electricity can be prevented from being transmitted to the user. It has been checked that an electrostatic capacity is about 8 kV when the rotary cleaning unit is provided only with the fiber filaments 132 without the metal filaments 133 but is reduced down to 1.6 kV when the rotary cleaning unit 130 is provided with both of the fiber filaments 132 and the metal filaments 133.

The fiber filament 132 may be formed of nylon. The metal filament 133 may include a fiber filament 133*a* (see FIG. 16) such as nylon and a conductive coating layer 133*b* (see FIG. 16). The fiber filament 133*a* included in the metal filament 133 may be made of the same material as or a different material from the material of the fiber filament 132 planted on the nozzle body 131 or the fiber layer 134. The metal filament 133 will be described in more detail with reference to FIG. 16.

Figure 16:
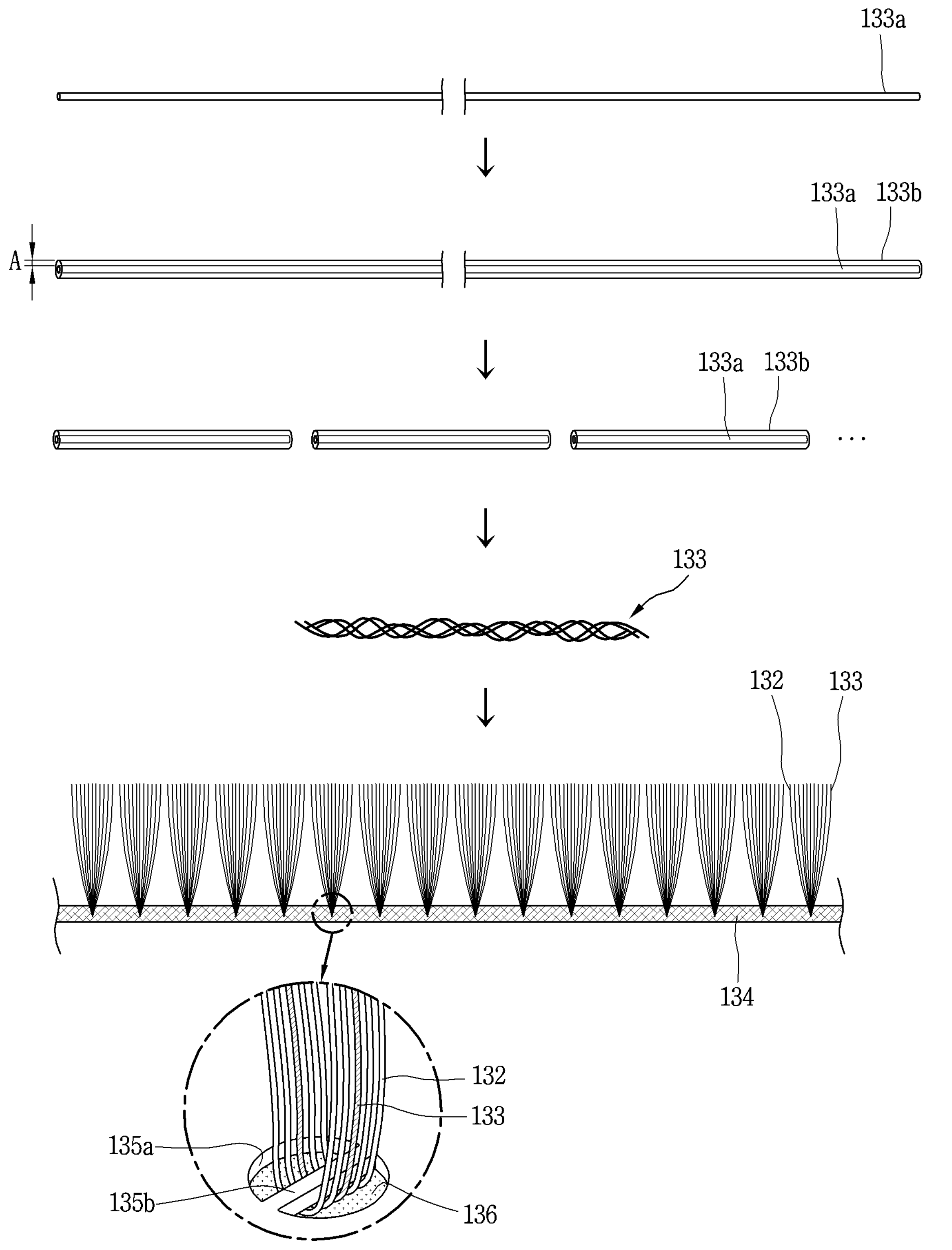
FIG. 16 is a conceptual view illustrating a fabricating process of the rotary cleaning unit.

FIG. 16 is a conceptual view illustrating a process of fabricating the rotary cleaning unit 130.

In order to fabricate the rotary cleaning unit 130, the metal filaments 133 must first be fabricated. These fabricated metal filaments 133 should be planted on the nozzle body 131 or the fiber layer 134 together with the fiber filaments 132.

Referring to FIG. 16, in order to fabricate the metal filament 133, a very long fiber filament 133*a* is first prepared. The fiber filament 133*a* may be formed of nylon.

Subsequently, a conductive material is coated on an outer circumferential surface of the fiber filament 133*a* to form the conductive coating layer 133*b*. The conductive coating layer 133*b* may be formed of brass or digenite ($Cu_9S_5$).

An average thickness of the conductive coating layer 133*b* is preferably 0.3 to 1.0 μm. An average thickness A of the conductive coating layer 133*b* refers to the remainder excluding a radius of the fiber filament 133*a* from a radius of the metal filament 133. If the average thickness of the conductive coating layer 133*b* is thinner than 0.3 μm, it is difficult to sufficiently prevent static electricity. This is because sufficient conductivity is not provided to the metal filament 133. On the contrary, if the average thickness of the conductive coating layer 133*b* exceeds 1.0 μm, friction against the floor or the carpet to be cleaned is excessively increased, making it difficult to smoothly perform cleaning.

Next, the fiber filament 133*a* having the conductive coating layer 133*b* is cut to have a length suitable to be planted. Several (a bundle) of the cut strands (threads, i.e., the cut fiber filaments) are twisted together to completely form one metal filament 133. Finally, the metal filament 133 is planted on the fiber layer 134 together with the fiber filament 132. The fiber filament 132 planted together with the metal filament 133 is formed by twisting a bundle of threads. The fiber layer 134 is formed with a plurality of planting portions 135*a*, 135*b* in which the fiber filaments 132 and the metal filaments 133 are planted. The planting portions 135*a*, 135*b* are disposed with being spaced apart from one another. Each planting portion 135*a*, 135*b* is provided with a hole 135*a* and a bridge 135*b* crossing the hole 135*a*.

The hole 135*a* of the planting portion 135*a*, 135*b* is divided into two by the bridge 135*b*. When the fiber filaments 132 and the metal filaments 133 to be planted on one planting portion 135*a*, 135*b* are inserted into one side hole to pass through another side hole, a center of the fiber filament 132 and a center of the fiber filament 133 are placed at a position where they meet the bridge 135*b*. Both ends of each of the fiber filament 132 and the metal filament 133 extend away from the center of the nozzle body 131.

The fiber filament 132 and the metal filament 133 are supported by a supporting portion 136. The supporting portion 136 is formed between the nozzle body 131 and the fiber layer 134. The fiber layer 134 is formed so as to surround the nozzle body 131 and the supporting portion 136 is formed by curing an adhesive between the nozzle body 131 and the fiber layer 134. The center of the fiber filament 132 and the center of the metal filament 133 may be fixed to the bridge 135*b* by the supporting portion 136.

The supporting portion 136 may decide the arrangement of the fiber filaments 132 and the metal filaments 133. For example, the supporting portion 136 may extend along a lengthwise direction of the nozzle body 131, extend along the circumferential direction of the nozzle body 131, or extend along a spiral direction of the nozzle body 131. Accordingly, the fiber filaments 132 and the metal filaments 133 may be arranged to extend along the lengthwise, circumferential, or spiral direction of the nozzle body 131.

When an object charged with positive (+) or negative (−) polarity is approaching, the metal filament 133 generates opposite electric charge of negative or positive polarity and instantaneously neutralizes static electricity by corona discharge. The metal filament 133 has an effect of eliminating the static electricity by the corona discharge.

Furthermore, since the metal filament 133 includes the conductive coating layer 133*b* formed of digenite, the metal filament 133 has an antibacterial and deodorizing performance provided by the digenite. For example, the metal filament 133 has antibacterial effects against *Staphylococcus aureus, Klebsiella pneumonia, E. coli, Pseudomonas aeruginosa*, and the like.

Also, the metal filament 133 has a heat storage performance and an electromagnetic wave absorption performance provided by the digenite. The heat storage performance refers to absorbing sunlight or near-infrared rays and converting them into thermal energy. The electromagnetic wave absorption performance refers to absorbing electromagnetic waves emitted from a mobile terminal or the like and converting them into thermal energy.

The average thickness of the metal filament 133 is preferably in the range of 220 to 260 dTex (deci-Tex or dexi-Tex). If the average thickness of the metal filament 133 is thinner than 220 dTex, the metal filaments 133 are sparsely disposed on the outer circumferential surface of the fiber layer 134, which may cause a degradation of the cleaning performance. Further, sealing may not be sufficiently performed, and thereby dust may be tangled between the metal filaments 133. On the contrary, when the average thickness of the metal filament 133 exceeds 260 dTex, the metal filament 133 is closely adhered on the body portion 111 (see FIG. 2) of the suction nozzle and thereby a load of the suction motor is excessively increased. Also, friction against the floor or carpet to be cleaned is excessively increased, making it difficult to smoothly perform the cleaning.

It is preferable that the number ratio of the metal filaments 133 to the sum of the fiber filaments 132 and the metal filaments 133 is 2.5% or more. For example, if the sum of the number of the fiber filaments 132 and the metal filaments 133 is 200, the number of the metal filaments 133 is preferably 5 or more. If the number ratio of the metal filaments 133 is 2.5% or less, the function of preventing the static electricity transmission or removing the static electricity cannot be sufficiently achieved. On the other hand, when the number ratio of the metal filaments 133 increases, the effect of preventing the static electricity transmission or removing the static electricity rises but the rise is not great. Also, when the number ratio of the metal filaments 133 reaches 25%, the effect of preventing the static electricity transmission or removing the static electricity is saturated.

Both the fiber filament 132 and the metal filament 133 have a certain thickness. Therefore, although the planting portions 134*a*, 135*b* are spaced apart from one another, the fiber filaments 132 and the metal filaments 133 planted on the planting portions 135*a*, 135*b* cover the outer circumferential surface of the nozzle body 131. Since the fiber filaments 132 and the metal filaments 133 cover the outer circumferential surface of the nozzle body 131, the number ratio of the metal filaments 133 almost coincides with an area ratio. Accordingly, it is preferable that the area ratio occupied by the metal filaments 133 on the outer circumferential surface of the nozzle body 131 is 2.5% or more. The technical significance of a lower limit or the saturation of the effect of preventing the static electricity transmission or removing the static electricity is replaced by that aforementioned in relation to the number ratio.

Electric resistance of one strand (thread) of the metal filament 133 is preferably 100 kΩ or less. The fact that the electric resistance of the metal filament 133 is not infinite refers to that the metal filament 133 has conductivity. However, if the electric resistance of one strand 133 of the metal filament 133 exceeds 100 kΩ, the effect of preventing the static electricity transmission or removing the static electricity is deteriorated.

A surface resistance value of the rotary cleaning unit 130 including the metal filaments 133 is preferably in the range of $1\times10^{2}$ to $1\times10^{3}\Omega/10$ cm. Also, a specific resistance value of the metal filament 133 is preferably in the range of $1\times10^{-1}$ to $1\times10^{-2}\Omega/10$ cm. The meaning of the surface resistance value and the meaning of the specific resistance value are replaced with the description of the meaning of the electric resistance of the single metal filament 133.

Tensile strength of the single metal filament 133 is preferably 3.5 cN/dTex (centi Newton/deci-Tex) or more. The tensile strength is a numerical value showing mechanical durability and reliability of the metal filament 133.

A tensile elongation of the single metal filament 133 is preferably 33 to 45%. When the rotary cleaning unit 130 rotate, the metal filaments 133 are tangled with the carpet to be cleaned. Therefore, the metal filament 133 must have a tensile elongation value of 33% or more so as to perform the cleaning while tangling with the carpet to be cleaned. However, if the tensile elongation of the metal filament 133 exceeds 45%, only some of the metal filaments 133 may excessively extend in length on the rotary cleaning unit 130 to be likely to form a non-uniform outer circumferential surface, which may cause deterioration of the cleaning performance.

A specific gravity of the metal filament 133 may be 1.05 to 1.20 g/cm3, and a process moisture regain may be 4.5% or less. These conditions are to ensure an optimal effect of preventing the static electricity transmission or removing the static electricity and an optimal cleaning performance.

Hereinafter, various examples of the rotary cleaning unit 130 will be described.

Figure 17:
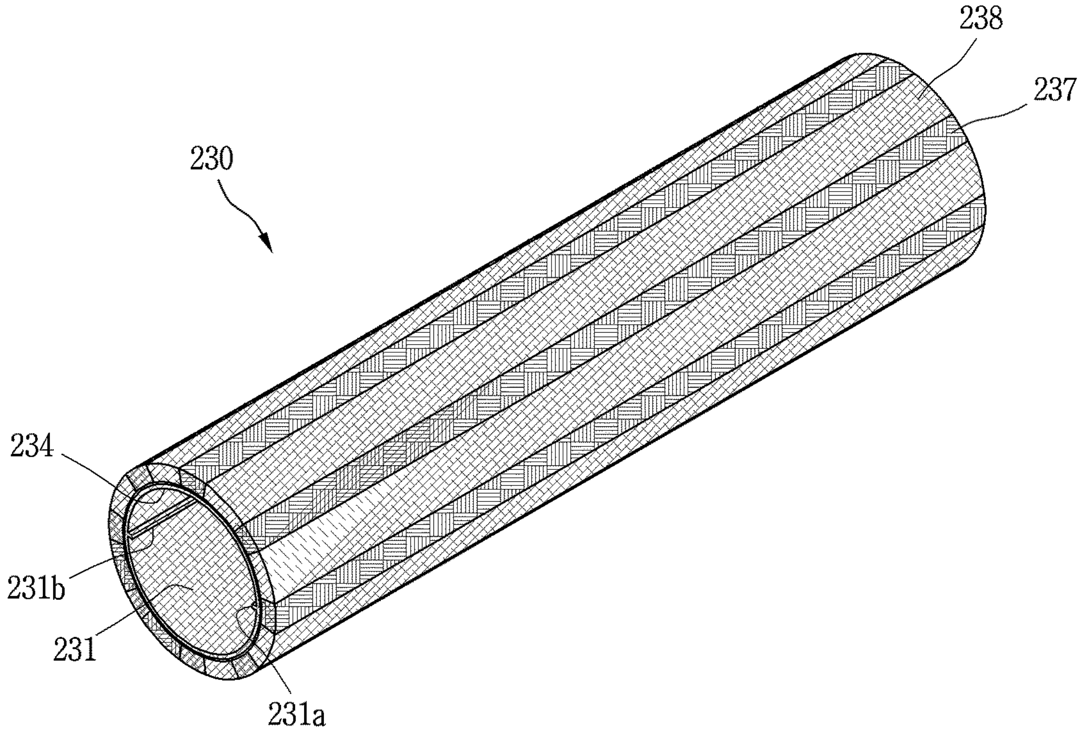
FIG. 17 is a conceptual view illustrating another example of the rotary cleaning unit.

FIG. 17 is a conceptual view illustrating another example of a rotary cleaning unit 230.

The rotary cleaning unit 230 includes a strap portion 237 and an antistatic portion 238. The strap portion 237 and the antistatic portion 238 are distinguished according to which one of the fiber filament 132 (see FIG. 16) and the metal filament 133 (see FIG. 16) is planted thereon.

The strap portion 237 is provided with the fiber filament 132. The metal filament 133 is not planted on the strap portion 237.

The antistatic portion 238 is provided with the fiber filament 132 and the metal filament 133. In the number ratio and the area ratio of the metal filaments 133 described above, each denominator is the sum of the strap portion 237 and the antistatic portion 238.

Referring to FIG. 17, the strap portion 237 extends along the lengthwise direction of the nozzle body 231. The plurality of strap portions 237 are spaced apart from each other. An antistatic portion 238 is disposed between the strap portions 237. Each of the antistatic portions 238 extends along the lengthwise direction of the nozzle body 231, like the strap portion 237. The antistatic portions 238 are spaced apart from each other.

Intervals between the strap portions 237 are equal to each other. Also, intervals between the antistatic portions 238 are equal to each other. Intervals between the strap portions 237 and the antistatic portions 238 may be the same as or different from each other. The strap portion 237 and the antistatic portion 238 may further include a dye coating layer.

In FIG. 17, unexplained reference numerals 231*a* and 231*b* denote protrusions, and 234 denotes a fiber layer.

Figure 18:
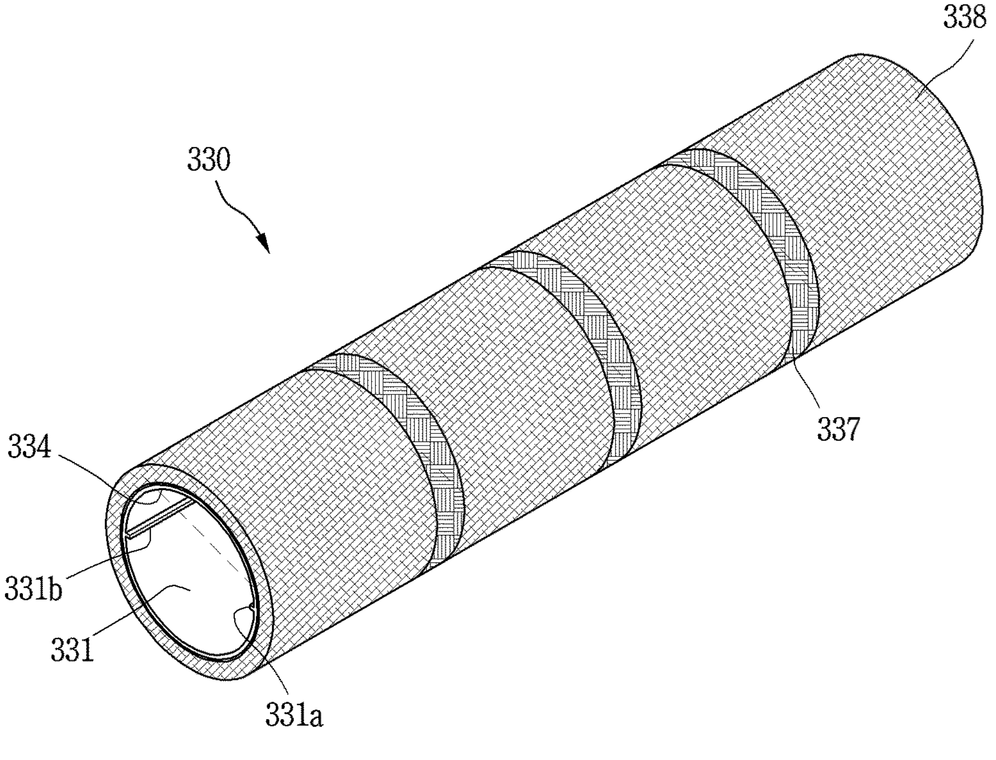
FIG. 18 is a conceptual view illustrating another example of the rotary cleaning unit.

FIG. 18 is a conceptual view illustrating another example of a rotary cleaning unit 330.

A strap portion 337 extends along a circumferential direction of the nozzle body 331. The plurality of strap portions 337 are spaced apart from each other. Antistatic portions 338 are disposed between the strap portions 337. Each antistatic portion 338 also extends along the circumferential direction of the nozzle body 331, like the strap portion 337. The antistatic portions 338 are spaced apart from each other.

Widths of the strap portions 337 and intervals therebetween are equal to each other. Also, widths of the antistatic portions 338 and intervals therebetween are equal to each other. Widths of the strap portions 337 and the antistatic portions 338 and intervals between the strap portions 337 and the antistatic portions 338 may be the same as or different from each other. The strap portion 337 and the antistatic portion 338 may further include a dye coating layer.

In FIG. 18, unexplained reference numerals 331*a* and 331*b* denote protrusions, and 334 denotes a fiber layer.

Figure 19:
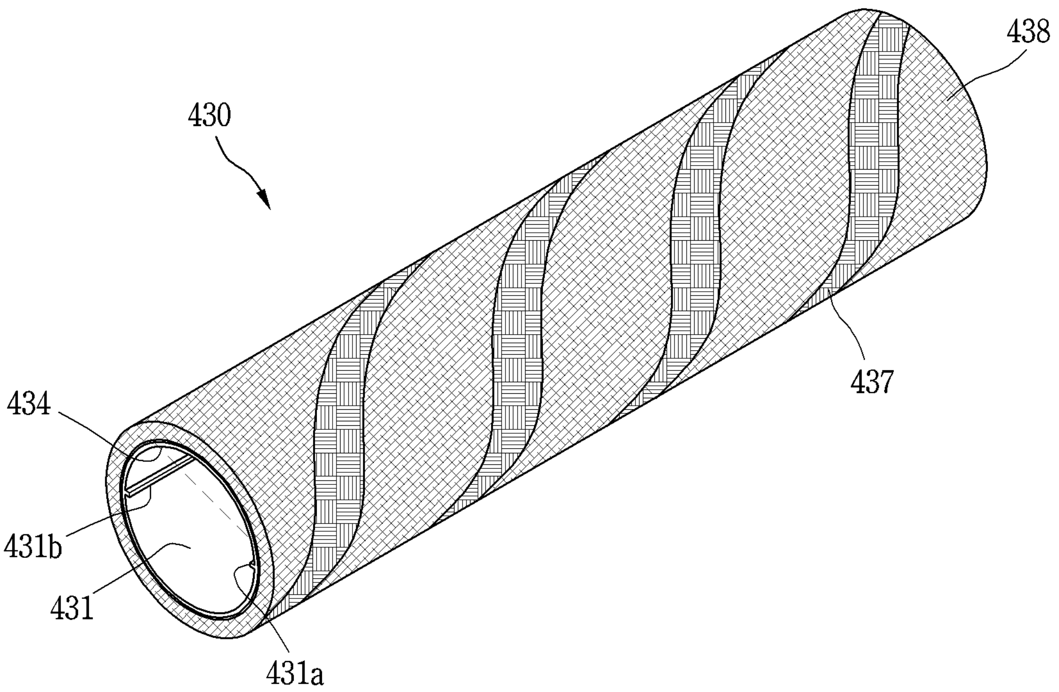
FIG. 19 is a conceptual view illustrating another example of the rotary cleaning unit.

FIG. 19 is a conceptual view illustrating another example of a rotary cleaning unit 430.

A strap portion 437 extends along a spiral direction of the nozzle body 431. The plurality of strap portions 437 are spaced apart from each other. Antistatic portions 438 are disposed between the strap portions 437. Each antistatic portion 438 also extends along the spiral direction of the nozzle body 431, like the strap portion 437. The antistatic portions 438 are spaced apart from each other.

The strap portion 437 and the antistatic portion 438 extend along the spiral direction. Accordingly, when viewing the rotary cleaning unit 430 from the front, the strap portions 437 are formed in an inclined shape and the antistatic portions 438 are arranged in an inclined state between the strap portions 437.

Widths of the strap portions 437 and intervals therebetween are equal to each other. Also, widths of the antistatic portions 438 and intervals therebetween are equal to each other. Widths of the strap portions 437 and the antistatic portions 438 and intervals between the strap portions 437 and the antistatic portions 438 may be the same as or different from each other. The strap portion 437 and the antistatic portion 438 may further include a dye coating layer.

In FIG. 19, unexplained reference numerals 431*a* and 431*b* denote protrusions, and 434 denotes a fiber layer.

Hereinafter, another example of a suction nozzle 510 will be described.

Figure 20:
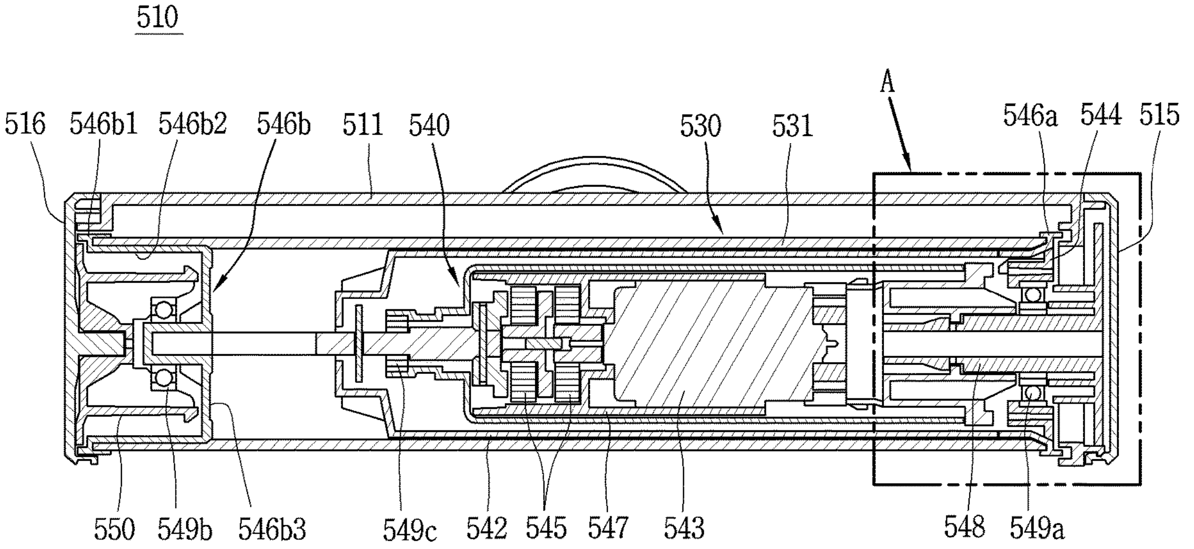
FIG. 20 is a sectional view illustrating another example of a suction nozzle.
Figure 21:
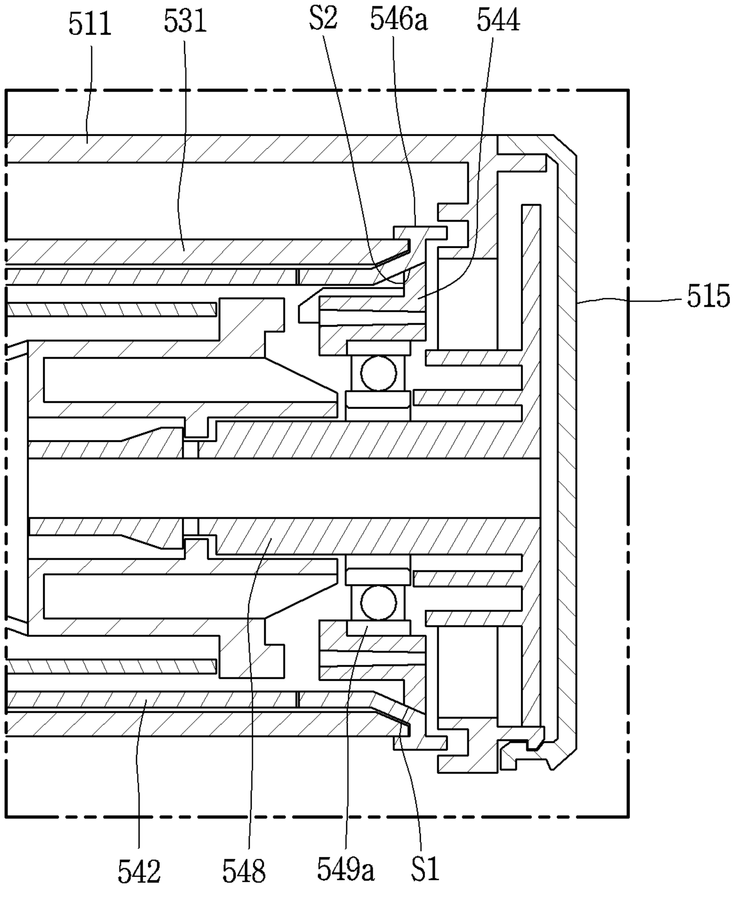
FIG. 21 is an enlarged sectional view of a portion A of FIG. 20.

FIG. 20 is a sectional view illustrating another example of a suction nozzle 510, and FIG. 21 is an enlarged sectional view of a portion A of FIG. 20.

The structure that a driving unit 540 is provided with a brushless DC (BLDC) motor and disposed at one side of a rotary cleaning unit 530 has been described above. However, the driving unit 540 may be provided with a DC motor 543 instead of the BLDC motor. In particular, DC motor 543 has an advantage in that it is less expensive than the BLDC motor.

If the DC motor 543 is large in size, it may be spatially insufficient to install the DC motor 543 in one side of the rotary cleaning unit 530. In this case, the DC motor 543, as illustrated in FIG. 20, may be installed inside (in a hollow of) a nozzle body 531. A driving force generated by the DC motor 543 may be transmitted to the nozzle body 531 through a shaft 548, a gear 545, and the like.

A cover portion 547 may be formed to enclose the DC motor 543 and the gear 545. The cover portion 547 is coupled to a circumference of the DC motor 543 and supports the DC motor 543.

A motor housing 542 is formed to enclose the DC motor 543, the gear 545, the cover portion 547, the shaft 548, and the like. The DC motor 543, the gear 545, the cover portion 547, the shaft 548, and the like are accommodated inside the motor housing 542.

The nozzle body 531 is rotatably supported by support members 549*a*, 544, and 550. Here, the support members 549*a*, 544, and 550 are conception that includes every configuration of rotatably supporting the nozzle body 631 regardless of a shape or arrangement thereof.

If the support members 549*a*, 544, 550 and the nozzle body 531 are formed of different materials, noise and scratches may be caused due to friction between the different materials. The suction nozzle 510 includes brackets 546*a* and 546*b* to suppress the generation of the noise and scratches. Since the brackets 546*a* and 546*b* are rotated together with the nozzle body 531, it may also be understood that the rotary cleaning unit 530 includes the brackets 546*a* and 546*b*.

A bearing portion 549*a*, 544 and a rotation supporting portion 550 illustrated in FIG. 20 rotatably support the nozzle body 531, so as to be included in the concept of the support members 549*a*, 544, and 550, respectively. Hereinafter, description will be sequentially given of a bracket 546*a* disposed between the bearing portion 549*a*, 544 and the nozzle body 531 and a bracket 546*b* disposed between the rotation supporting portion 550 and the nozzle body 531. The two brackets 546*a* and 546*b* may be referred to as a first bracket 546*a* and a second bracket 546*b* for distinction from each other.

The bearing portion 549*a*, 544 is disposed around the shaft 548 to rotate together with the shaft 548. The bearing portion 549*a*, 544 includes a bearing 549*a* and a bearing cover 544.

The bearing 549*a* is disposed around the shaft 548 to support the rotating shaft 548. The bearing 549*a* serves to fix the shaft 548 to a predetermined position, and rotate the shaft 548 while supporting the weight of the shaft 548 and the load of the shaft 548.

The bearing 549*a* may be installed at each position where the support of the shaft 548 is required. FIG. 20 illustrates three bearings 549*a*, 549*b*, and 549*c* disposed around the shaft 548.

The bearing cover 544 protects the bearing 549*a*. The bearing cover 544 is installed around the bearing 549*a*. However, the bearing cover 544 is not provided for each bearing 549*a*. For example, only some of the bearings 549*a*, 549*b*, and 549*c* may be provided with the bearing cover 544.

The bearing cover 544 is formed of a material different from that of the nozzle body 531. It has been described that the nozzle body 531 may be formed of an extrusion-molded metal material. The bearing cover 544, on the other hand, may be formed of an injection-molded plastic material.

The first bracket 546*a* is coupled to an end portion of the nozzle body 531 to suppress the generation of noise and scratches due to friction between the end portion of the nozzle body 531 and the bearing 549*a*. The first bracket 546*a* is press-fitted into the end portion of the nozzle body 531 in the lengthwise direction of the nozzle body 531 (a horizontal direction or an extending direction of the shaft 548 in FIG. 20) or attached on the end portion of the nozzle body 531 by an adhesive.

The first bracket 546*a* is disposed between the nozzle body 531 and the bearing cover 544. This is because the first bracket 546*a* can suppress the generation of noise and scratches due to friction between the nozzle body 531 and the bearing cover 544.

The first bracket 546*a* is formed of an injection-molded plastic material. This is because the generation of noise and scratches due to friction between different materials can be suppressed when the first bracket 546*a* and the bearing cover 544 are made of the same material. However, the same material does not mean the completely same material.

As the first bracket 546*a* is coupled to the nozzle body 531, the first bracket 546*a* is in contact with the bearing portion 549*a*, 544. More specifically, the first bracket 546*a* comes into surface-contact with an outer circumferential surface of the bearing cover 544. Therefore, the bearing cover 544 and the first bracket 546*a* are provided with a mutual contact surface S1, S2. The mutual contact surface S1, S2 refers to at least one of a surface S1 (see FIG. 21) of the bearing cover 544 which is in contact with the first bracket 546*a*, and a surface S2 (see FIG. 21) of the first bracket 546*a* which is in contact with the bearing cover 544.

Referring to FIG. 21, the mutual contact surface S1, S2 of the bearing cover 544 and the first bracket 546*a* are inclined with respect to the lengthwise direction of the nozzle body 531. If the mutual contact surface S1, S2 between the bearing cover 544 and the first bracket 546*a* is parallel to the lengthwise direction of the nozzle body 531, positions of the bearing 549*a* and the bearing cover 544 are not fixed during the rotation of the shaft 548. Accordingly, the shaft 548 is likely to move along the lengthwise direction of the nozzle body 531.

Therefore, in order to fix the positions of the bearing 549*a* and the bearing cover 544 during the rotation of the shaft 548, the mutual contact surface S1, S2 between the first bracket 546*a* and the bearing cover 544 is preferably inclined with respect to the lengthwise direction of the nozzle body 531.

From a three-dimensional viewpoint, the mutual contact surface S1, S2 may have a shape corresponding to a side surface of a circular truncated cone. In this case, a radius of the mutual contact surface S1, S2 may gradually increase from the center of the nozzle body 531 toward the outside along the lengthwise direction. As the radius of the mutual contact surface S1, S2 gradually increases, the mutual contact surface S1, S2 is inclined with respect to the lengthwise direction of the nozzle body 531.

The brackets 546*a* and 546*b* may be coupled to both sides of the nozzle body 531, respectively. Referring to FIG. 20, the second bracket 546*b* coupled to the left side of the nozzle body 531 is formed so as to enclose the rotation supporting portion 550.

The rotation supporting portion 550 is coupled to a side cover 516 of the suction nozzle 510. The rotation supporting portion 550 is inserted into one end portion of the nozzle body 531 so as to rotatably support the nozzle body 531.

The second bracket 546*b* is physically connected to the shaft 548 that transmits the driving force of the DC motor 543. For example, the second bracket 546*b* may be provided with a polygonal groove (not shown) or a hole (not shown) corresponding to the shaft 548, and the shaft 548 may be inserted into the groove or hole.

The driving force of the DC motor 543 may be transmitted to the nozzle body 531 through the shaft 548, the gear 545, and the second bracket 546*b*. The rotation supporting portion 550 may be fixed to rotate relative to the nozzle body 531 or rotate together with the nozzle body 531. When the rotation supporting portion 550 rotates together with the nozzle body 531, the driving force of the DC motor 543 may be transmitted to the nozzle body 531 through the shaft 548, the gear 545, the second bracket 546*b*, and the rotation supporting portion 550.

The rotation supporting portion 550 may be formed of an injection-molded plastic material. Accordingly, when the rotation supporting portion 550 and the nozzle body 531 are in direct contact with each other, noise and scratches are caused due to friction between different materials. Since the second bracket 546*b* is disposed between the rotation supporting portion 550 and the nozzle body 531, the generation of the noise and scratches can be suppressed. This is because the second bracket 546*b* is formed of the same material as that of the rotation supporting portion 550. However, the same material does not mean the completely same material.

The second bracket 546*b* includes a nozzle body coupling portion 546*b*1, an extending portion 546*b*2, and a shaft coupling portion 546*b*3.

The nozzle body coupling portion 546*b*1 is formed in a circular shape so as to be coupled to the end portion of the nozzle body 531. The nozzle body coupling portion 546*b*1 is formed in a shape of surrounding inner and outer circumferential surfaces of the nozzle body 531. The nozzle body 531 is sandwiched between a portion enclosed by the nozzle body 531 and a portion enclosing the nozzle body 531.

The extending portion 546*b*2 extends from the nozzle body coupling portion 546*b*1 to the inside of the nozzle body 531 along the inner circumferential surface of the nozzle body 531. The extending portion 546*b*2 may be in contact with the inner circumferential surface of the nozzle body 531.

The extending portion 546*b*2 may press the inner circumferential surface of the nozzle body 531 in a radial direction (a thickness direction from the inner circumferential surface to the outer circumferential surface). For example, if a distance between two opposing portions of the extending portion 546*b*2 (a distance including the thickness of the extending portion 546*b*2) is greater than an inner diameter of the nozzle body 531, the two portions of the extending portion 546*b*2 may press the inner circumferential surface of the nozzle body 531 in the radial direction. Since the extending portion 546*b*2 presses the inner circumferential surface of the nozzle body 531, the second bracket 546*b* can be prevented from being arbitrarily separated from the nozzle body 531.

The shaft coupling portion 546*b*3 extends from the extending portion 546*b*2 toward the shaft 548 to be coupled to the shaft 548. The shaft coupling portion 546*b*3 may be disposed between the rotation supporting portion 550 and the driving unit 540. A polygonal groove or hole corresponding to the shaft 548 may be formed in the shaft coupling portion 546*b*3. The shaft 548 may be inserted with the groove or hole, and the driving force may be transmitted through the polygonal structure.

Figure 22:
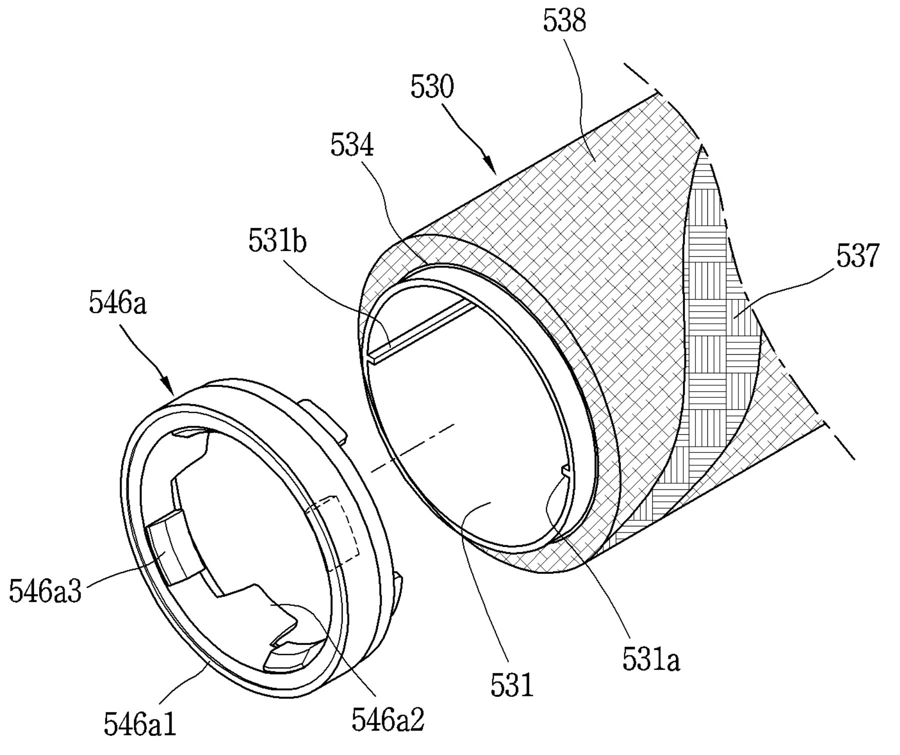
FIG. 22 is a conceptual view of the rotary cleaning unit and a first bracket coupled to the rotary cleaning unit.

As described above, the nozzle body 531 is provided with protrusions 531*a* and 531*b* (see FIG. 22). The protrusions 531*a* and 531*b* protrude from the inner circumferential surface of the nozzle body 531 and extend along the lengthwise direction of the nozzle body 531.

If the second bracket 546*b* rotates relative to the nozzle body 531 by 360 degrees, the driving force may not be sufficiently transmitted to the nozzle body 531. For example, the nozzle body 531 may run idle. This is because the driving force is transmitted to the nozzle body 531 through the second bracket 546*b*.

In order to prevent such a phenomenon, the extending portion 546*b*2 of the second bracket 546*b* and the protrusions 531*a* and 531*b* should be in contact with each other. Even if the second bracket 546*b* and the nozzle body 531 rotate relative to each other by a predetermined angle, the extending portion 546*b*2 presses the protrusions 531*a* and 531*b* in a rotating direction of the nozzle body 531 and accordingly the driving force may eventually be transmitted. For this purpose, the protrusions 531*a*, 531*b* and the extending portion 546*b*2 must be located on the same plane. Here, the same plane refers to the inner circumferential surface of the nozzle body 531.

In FIGS. 20 and 21, unexplained reference numeral 515 denotes a side cover.

FIG. 22 is a conceptual view of the rotary cleaning unit 530 and the first bracket 546*a* coupled to the rotary cleaning unit 530.

The nozzle body 531 of the rotary cleaning unit 530 is coupled to the first bracket 546*a*. The nozzle body 531 is rotatably supported by the bearing cover 544 as the first bracket 546*a* comes in surface-contact with the bearing cover 544.

The first bracket 546*a* includes a nozzle body coupling portion 546*a*1, an extending portion 546*a*2, and a surface-contact portion 546*a*3.

The nozzle body coupling portion 546*a*1 is formed in a circular shape so as to be coupled to the end portion of the nozzle body 531. The nozzle body coupling portion 546*a*1 is formed to enclose the inner and outer circumferential surfaces of the nozzle body 531. The nozzle body 531 is sandwiched between a portion enclosed by the nozzle body 531 and a portion enclosing the nozzle body 531.

The extending portion 546*a*2 extends from the nozzle body coupling portion 546*a*1 to the inside of the nozzle body 531 along the inner circumferential surface of the nozzle body 531. The extending portion 546*a*2 may be in contact with the inner circumferential surface of the nozzle body 531.

The extending portion 546*a*2 may be provided in plurality. For example, FIG. 22 exemplarily illustrates that the first bracket 546*a* is provided with four extending portions 546*a*2. Each extending portion 546*a*2 may press the inner circumferential surface of the nozzle body 531 in the radial direction (the thickness direction from the inner circumferential surface to the outer circumferential surface).

When a distance between the opposing extending portions 546*a*2 (a distance including the thickness of the extending portion 546*a*2) is greater than an inner diameter of the nozzle body 531, the two extending portions 546*a*2 may press the inner circumferential surface of the nozzle body 531 in the radial direction. Since the two extending portions 546*a*2 press the inner circumferential surface of the nozzle body 531, the first bracket 546*a* can be prevented from arbitrarily separated from the nozzle body 531.

The structure in which the extending portions 546*a*2 are in contact with the protrusions 531*a* and 531*b* of the nozzle body 531 so as to press the protrusions 531*a* and 531*b* in the rotating direction may also be applied to the second bracket 546*b*.

The surface-contact portion 546*a*3 protrudes from the inner circumferential surface of the nozzle body coupling portion 546*a*1. The surface-contact portion 546*a*3 is in surface-contact with the bearing portion 549*a*, 544 so as to support the rotation of the shaft 548 and the bearing portion 549*a*, 544. The mutual contact surface S1, S2 (see FIG. 21) between the first bracket 546*a* and the bearing cover 544 have been described. The mutual contact surface S2 of the first bracket 546*a* corresponds to the surface-contact portion 546*a*3. Therefore, the description of the structure of the surface contact portion 546*a*3 that is formed to be inclined or extends toward the outside is replaced with the foregoing description.

The surface-contact portion 546*a*3 may be provided in plurality. For example, FIG. 22 exemplarily illustrates that the first bracket 546*a* is provided with four surface-contact portions 546*a*3. In this case, the surface-contact portions 546*a*3 may be spaced apart from one another. The mutual contact surface S1 of the bearing cover 544 is a closed curve while the surface-contact portion 546*a*3 is not a closed curve.

The extending portions 546*a*2 and the surface-contact portions 546*a*3 may be alternately arranged to evenly distribute a force applied to the surface-contact portion 546*a*3 in response to supporting the nozzle body 531 and a force required to prevent an arbitrary separation of the first bracket 546*a* from the nozzle body 531 to the first bracket 546*a*.

In FIG. 22, unexplained reference numeral 534 denotes a fiber layer, 537 denotes a strap portion, and 538 denotes an antistatic portion.

The vacuum cleaner described above is not limited to the configurations and the methods of the embodiments described above, but the embodiments may be configured by selectively combining all or part of the embodiments so that various modifications or changes can be made.

According to the present disclosure having the above-described structure, metal filaments provided on a rotary cleaning unit can serve as a passage for charging or neutralizing static electricity generated in fiber filaments. Therefore, the static electricity generated in the fiber filaments can be discharged or eliminated through the metal filaments before being transmitted to the user.

In addition, the present disclosure can provide an optimum average thickness of a conductive coating layer or an optimal average thickness of a metal filament, so as to prevent deterioration of a cleaning performance due to an antistatic structure or overload of a suction motor.

Further, the present disclosure can improve reliability of an antistatic structure by providing an optimal physical property value of the metal filament.

What is claimed is:

1. A vacuum cleaner, comprising:
a cleaner body; and
a suction nozzle connected to the cleaner body,
wherein the suction nozzle comprises:
- a housing defining an opening at a front portion of the housing,
- a rotary cleaning unit located inside of the housing and configured to rotate relative to the housing, at least a portion of the rotary cleaning unit being exposed through the opening of the housing, and
- a driving unit coupled to the housing, the driving unit comprising (i) a motor located at a side of the rotary cleaning unit and (ii) a gear portion configured to transmit power of the motor to the rotary cleaning unit, wherein the rotary cleaning unit comprises:
- a nozzle body rotatably coupled to an inside of the housing, the nozzle body having a cylindrical shape,
- a protrusion that protrudes from an inner circumferential surface of the nozzle body, the protrusion having a surface that is oriented in a circumferential direction of the nozzle body, and a plurality of fiber filaments and a plurality of metal filaments disposed on an outer circumferential surface of the nozzle body, wherein the surface of the protrusion includes:

(i) a first surface that is configured to engage with the driving unit by rotation of the driving unit to rotate the rotary cleaning unit and (ii) a second surface that is opposite to the first surface, the first surface and the second surface being adjacent to each other, and wherein a circumferential distance of the inner circumferential surface of the nozzle body between the first surface and the second surface is longer than a circumferential distance of the driving unit disposed between the first surface and the second surface such that the driving unit is configured to rotate along the inner circumferential surface of the nozzle body to engage with the first surface.

2. The vacuum cleaner of claim 1, wherein each metal filament comprises:

a fiber filament; and a conductive coating layer disposed on an outer circumferential surface of the fiber filament.

3. The vacuum cleaner of claim 2, wherein the conductive coating layer comprises brass or digenite ($Cu_9S_5$).

4. The vacuum cleaner of claim 2, wherein an average thickness of the conductive coating layer is from 0.3 to 1.0 μm.

5. The vacuum cleaner of claim 1, wherein an average thickness of the plurality of metal filaments is from 220 to 260 deci-Tex (dTex).

6. The vacuum cleaner of claim 1, wherein a ratio of a number of the plurality of metal filaments to a total number of the plurality of fiber filaments and the plurality of metal filaments is greater than or equal to 2.5%.

7. The vacuum cleaner of claim 1, wherein a ratio of an area of the plurality of metal filaments to a total area of the outer circumferential surface of the nozzle body is greater than or equal to 2.5%.

8. The vacuum cleaner of claim 1, wherein an electric resistance of a single metal filament of the plurality of metal filaments is less than or equal to 100 kΩ.

9. The vacuum cleaner of claim 1, wherein a tensile strength of a single metal filament of the plurality of metal filaments is greater than or equal to 3.5 centi-Newton/deci-Tex (cN/dTex).

10. The vacuum cleaner of claim 1, wherein a tensile elongation of a single metal filament of the plurality of metal filaments corresponds to 33 to 45% of a length of the single metal filament.

11. The vacuum cleaner of claim 1, wherein a surface resistance value of the rotary cleaning unit is from 1×102 to 1×103Ω/10 cm.

12. The vacuum cleaner of claim 1, wherein a specific resistance value of the plurality of metal filaments is 1×10-1 to 1×10-2Ω/10 cm.

13. The vacuum cleaner of claim 1, wherein the rotary cleaning unit comprises:

a strap portion that includes the plurality of fiber filaments; and an antistatic portion that includes both of the plurality of fiber filaments and the plurality of metal filaments, and wherein the strap portion and the antistatic portion each extend at least one of in a lengthwise direction of the nozzle body, the circumferential direction of the nozzle body, or a spiral direction of the nozzle body.

14. The vacuum cleaner of claim 1, further comprising a bracket configured to rotate with the protrusion to transmit the power of the motor to the rotary cleaning unit, wherein the surface of the protrusion is configured to engage with the bracket based on rotation of the driving unit.

15. The vacuum cleaner of claim 14, wherein the protrusion has a rectangular cross-sectional shape and extends straight to both ends along a longitudinal direction of the nozzle body.

16. The vacuum cleaner of claim 14, wherein the bracket includes an extending portion, and the extending portion of the bracket and the protrusion are configured to be disposed at a common plane defined by the inner circumferential surface of the nozzle body.

17. The vacuum cleaner of claim 16, wherein a distance between two opposing portions of the extending portion defining a thickness of the extending portion is greater than an inner diameter of the nozzle body.

18. The vacuum cleaner of claim 1, wherein the surface of the protrusion is configured to, based on rotation of the driving unit, couple to the gear portion and receive the power of the motor from the gear portion.

19. The vacuum cleaner of claim 1, wherein the plurality of metal filaments extends along a longitudinal direction of the nozzle body, the circumferential direction of the nozzle body, or a spiral direction of the nozzle body.

20. A vacuum cleaner, comprising:

a cleaner body; and a suction nozzle connected to the cleaner body, wherein the suction nozzle comprises:

a housing defining an opening at a front portion of the housing, and a rotary cleaning unit located inside of the housing and configured to rotate relative to the housing, at least a portion of the rotary cleaning unit being exposed through the opening of the housing, wherein the rotary cleaning unit comprises:

a nozzle body rotatably coupled to an inside of the housing, the nozzle body having a cylindrical shape, a plurality of fiber filaments and a plurality of metal filaments disposed on an outer circumferential surface of the nozzle body, a fiber layer that surrounds the outer circumferential surface of the nozzle body, and a supporting portion configured to support the plurality of fiber filaments and the plurality of metal filaments, wherein the fiber layer includes a plurality of planting portions that are spaced apart from each other, each planting portion being configured to receive a portion of the plurality of fiber filaments and a portion of the plurality of metal filaments, wherein each planting portion comprises a hole and a bridge that crosses the hole, wherein each fiber filament comprises a bundle of threads that twist around each other, and each metal filament comprises a bundle of threads that twist around each other, wherein a center of each fiber filament and a center of each metal filament are coupled to the bridge, wherein an end of each fiber filament and an end of each metal filament extend outward from a center of the nozzle body, and wherein the supporting portion comprises an adhesive that is cured between the nozzle body and the fiber layer, the supporting portion extending at least one of in a lengthwise direction of the nozzle body, a circumferential direction of the nozzle body, or a spiral direction of the nozzle body.

* * * * *